(12) United States Patent
Manczak et al.

(10) Patent No.: US 7,752,417 B2
(45) Date of Patent: Jul. 6, 2010

(54) DYNAMIC SELECTION OF MEMORY VIRTUALIZATION TECHNIQUES

(75) Inventors: Olaf Manczak, Hayward, CA (US); Christopher A. Vick, San Jose, CA (US); Michael H. Paleczny, San Jose, CA (US); Jay R. Freeman, Palo Alto, CA (US); Phyllis E. Gustafson, Pleasanton, CA (US)

(73) Assignee: Oracle America, Inc., Redwood City, CA (US)

( * ) Notice: Subject to any disclaimer, the term of this patent is extended or adjusted under 35 U.S.C. 154(b) by 200 days.

(21) Appl. No.: 11/447,189

(22) Filed: Jun. 5, 2006

(65) Prior Publication Data

US 2007/0283125 A1 Dec. 6, 2007

(51) Int. Cl.
*G06F 12/00* (2006.01)
(52) U.S. Cl. .................................. 711/209; 718/100
(58) Field of Classification Search ................ None
See application file for complete search history.

(56) References Cited

U.S. PATENT DOCUMENTS

| | | | |
|---|---|---|---|
| 6,804,755 B2 | 10/2004 | Selkirk | |
| 6,898,677 B2 | 5/2005 | Arimilli | |
| 6,983,355 B2 | 1/2006 | Ripberger | |
| 7,111,145 B1* | 9/2006 | Chen et al. ................. | 711/206 |
| 2001/0020264 A1* | 9/2001 | Belgard ..................... | 711/206 |
| 2002/0144184 A1* | 10/2002 | Anvin et al. ................. | 714/38 |
| 2003/0088752 A1* | 5/2003 | Harman ..................... | 711/202 |
| 2004/0117585 A1 | 6/2004 | Glider | |
| 2005/0076156 A1 | 4/2005 | Lowell | |
| 2007/0005870 A1 | 1/2007 | Neiger | |

OTHER PUBLICATIONS

IBM TDB, Software Monitor for Performance Tuning a Virtual Memory Computer System, May 1973, vol. 15, pp. 3730-3733.*
Sep. 24, 2009 www.m-w.com Query=policy.*
Sep. 24, 2009 www.dictionary.com Query=policy.*
Sep. 24, 2009 www.dictionary.oed.com Query=policy.*
U.S. Appl. No. 11/446645, filed Jun. 5, 2006.
U.S. Appl. No. 11/446644, filed Jun. 5, 2006.
U.S. Appl. No. 11/446620, filed Jun. 5, 2006.

* cited by examiner

*Primary Examiner*—Christian P Chace
*Assistant Examiner*—Chad L Davidson
(74) *Attorney, Agent, or Firm*—Robert C. Kowert; Meyertons, Hood, Kivlin, Kowert & Goetzel, P.C.

(57) ABSTRACT

A computer system may be configured to dynamically select a memory virtualization and corresponding virtual-to-physical address translation technique during execution of an application and to dynamically employ the selected technique in place of a current technique without re-initializing the application. The computer system may be configured to determine that a current address translation technique incurs a high overhead for the application's current workload and may be configured to select a different technique dependent on various performance criteria and/or a user policy. Dynamically employing the selected technique may include reorganizing a memory, reorganizing a translation table, allocating a different block of memory to the application, changing a page or segment size, or moving to or from a page-based, segment-based, or function-based address translation technique. A selected translation technique may be dynamically employed for the application independent of a translation technique employed for a different application.

19 Claims, 11 Drawing Sheets

| TLB 410 | |
|---|---|
| virtual address 412 | physical address 422 |
| virtual address 413 | physical address 423 |
| virtual address 414 | physical address 424 |
| virtual address 415 | physical address 425 |
| ... | ... |

*FIG. 4*

|header (source, destination) | transaction code | token | memory request (size)|

| associative array 1010 ||
|---|---|
| process ID 1 1012 | address range 1 1022 |
| process ID 2 1013 | address range 2 1023 |
| process ID 3 1014 | address range 3 1024 |
| process ID 4 1015 | address range 4 1025 |
| ... | ... |

DYNAMIC SELECTION OF MEMORY VIRTUALIZATION TECHNIQUES

The U.S. Government has a paid-up license in this invention and the right in limited circumstances to require the patent owner to license others on reasonable terms as provided for by the terms of Contract No. NBCH3039002 awarded by the Defense Advanced Research Projects Agency (DARPA).

BACKGROUND OF THE INVENTION

1. Field of the Invention

This invention relates to computer systems, and more specifically to techniques for memory virtualization.

2. Description of the Relevant Art

Modern computer systems provide a feature known as "virtual memory", or "virtual memory addressing", a technique of memory address translation between addresses used in a software application and physical memory addresses. These translation mechanisms allow the addresses used by the application to be independent of the addresses of the underlying physical memory. Thus, an application may access addresses that translate to locations in a processor's local or main memory (e.g., the CPU's caches, or local dynamic RAM) or to locations in disk storage (which is slower, but may be much larger) without having to know which it is accessing.

When used in combination with a technique of "swapping" or "paging", virtual memory addressing may provide an application with the illusion that the memory address space is contiguous, even if the physical memory allocated to the application is not contiguous, and/or possibly that it is larger than the machine's physical memory. Typically, the application cannot address physical memory directly but only after going through the translation process. This translation process is generally transparent to the application programmer and is implemented in specialized hardware, memory management software, or a combination of the two.

There are several different techniques for transparent translation between memory addresses used by an application and physical addresses. These include page-based translation and segment-based translation. In page-based translation, the high order bits of the binary representation of a logical (virtual) address are used as an index or key to an address translation table, called a page table, while the low order bits are used directly as the low order bits of the physical address. Thus, a "page" of memory is a range of consecutive virtual addresses having the same high order bits and corresponding to a particular block of physical memory. In segmentation, physical memory is divided into blocks of different sizes, called segments. Software programs and their associated data structures are stored in one or more of these segments. This technique generally represents a higher organizational level than pages, and tends to reflect the type of information that is to be stored in any memory segment. For example, a program's instructions may be stored in one segment and its data structures may be stored in another segment.

Currently, computer architectures are configured to employ a single, static address translation technique, which may be selectable during initialization or at system reset. This address translation technique is usually implemented in a combination of processor hardware and memory management software that provides the functionality described above. The single translation technique employed may have a significant impact on the overall performance of the computer system. For example, a particular technique may result in very poor performance under certain workloads, while, under the same workload, a different technique may result in higher performance. Similarly, a particular technique may result in very high performance for certain applications and poor performance for others.

SUMMARY

A system and method for dynamically selecting a memory virtualization and corresponding virtual-to-physical address translation technique during execution of an application and dynamically employing the selected technique in place of a current technique is disclosed. In some embodiments the dynamically selected technique is employed without stopping or re-initializing the application.

A computer system configured to support multiple memory virtualization techniques may also be configured to determine that a current virtual-to-physical address translation technique incurs a high overhead for the application's current workload, in some embodiments. In some embodiments an initial memory virtualization/translation technique may be selected based on a predicted distribution of virtual memory addresses to be accessed by the application, such as compilation time. In other embodiments, an initial technique may represent a default configuration or may be dependent on a user policy or received user input.

The system may be configured to dynamically select a different virtualization/translation technique dependent on various performance criteria. For example, a performance monitor or profiler may measure a number of translation lookaside buffer (TLB) misses, a memory access time, or other indicator of the performance of the current virtual-to-physical address translation technique and may compare these measurements to a given threshold. If the monitor or profiler detects that one or more of these measurements are out of the acceptable range, the system may be configured to determine a more suitable technique for the application, based on its current workload. Selecting a second technique may be dependent on the results of the monitor or profiler, in some embodiments, as well as on the organization and configuration of available memory. In some embodiments, the selection of a second technique may be dependent on a user policy. For example, guidelines may exist for selecting a particular technique for an application whose workload matches a given profile. In other embodiments, a user may direct the system to select and employ a particular technique, such as if the user analyzes the output of a monitor or profiler to determine a more suitable technique for the current workload.

Dynamically employing the selected second technique may include moving to or from a page-based, a segment-based, or a function-based address translation technique, in different embodiments. Function-based address translation techniques, in which translations are calculated rather than based on a table-lookup, are described in more detail below. In some embodiments, it may include reorganizing a memory, reorganizing a translation table, allocating a different block of memory to the application, or changing a page or segment size, whether or not the basic translation technique is changed. A selected translation technique may be dynamically employed for a given application independent of a translation technique employed for a different application, in some embodiments.

BRIEF DESCRIPTION OF THE DRAWINGS

FIG. 4 illustrates an exemplary Translation Lookaside Buffer (TLB).

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Introduction

Figure 1:
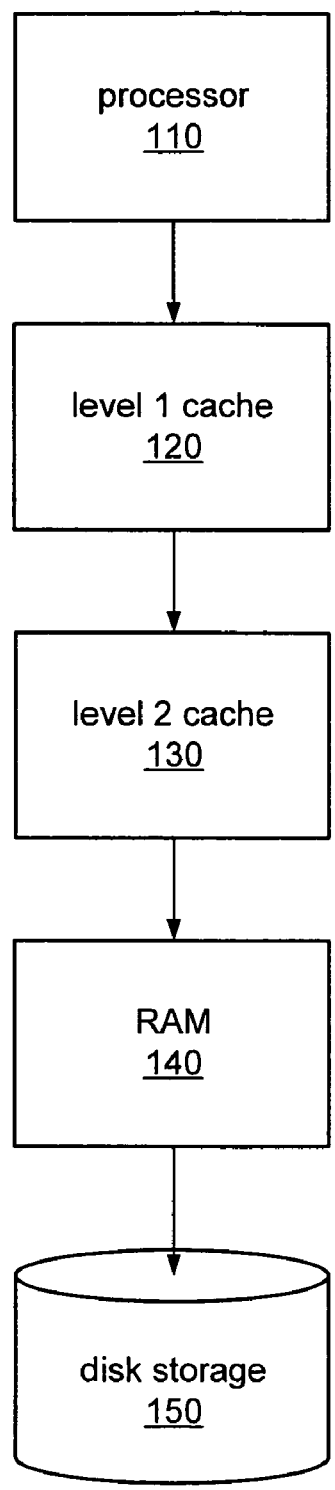
FIG. 1 illustrates a simplified representation of a memory hierarchy, according to one embodiment.

Many modern computer systems have adopted a hierarchical memory system, typically involving at least two or three layers. An example of such a configuration is illustrated by FIG. 1. In this example, a microprocessor 110 may be attached to a level 1 (L1) cache 120 and then to a level 2 (L2) cache 130. The L1 cache 120 may be fabricated on the same semiconductor device as processor 110, and so may provide very fast data access for processor 110, while the L2 cache 130 may or may not be a separate semiconductor storage device and may have longer access times than L1 cache 120. The next device in the memory hierarchy, in this example, is random access memory (RAM) 140. This may also be referred to by a variety of other names, such as physical memory, system memory, main memory, or internal storage. RAM 140 may be implemented as a semiconductor device typically distinct from microprocessor 110, but may be significantly slower than L1 cache 120 and L2 cache 130. RAM 140 may have a correspondingly greater capacity than caches 120 and 130. The final memory component, as illustrated in FIG. 1, may be a hard disk drive, such as disk storage 150. This component may also be referred to as external storage, and may provide non-volatile storage for a large volume of data. However, data access from a disk drive may be a relatively slow process in comparison to data accesses from other levels of the memory hierarchy.

In computer systems employing virtual memory, an application executing on a processor, such as processor 110, may access physical memory at any of the levels of hierarchy described above without knowing which it is accessing. A combination of specialized hardware, such as a memory management unit (MMU) and memory management software may in some embodiments to be used to manage allocation of physical memory (such as RAM 140 or disk storage 150) to various processes executing on processor 110, to assign and maintain mappings of virtual address spaces to physical address spaces, and to translate virtual addresses to physical ones when an application accesses memory at a given virtual memory address. Memory management software may be part of the computer system's operating software or may be a standalone application, in different embodiments.

As described above, a page table may provide the high order bits of the physical address of the page. Within this range of addresses, the low order bits of the virtual address may be used as an offset into the particular block of physical memory. Therefore, only the physical location of the start of the relevant page may need to be determined by the MMU.

In some computer systems, there may be a hierarchy of page tables. For example, there may be a master page table containing an index to multiple other pages tables. Each of these second-level page tables may then be used to index physical pages of memory, such as for a particular virtual address range. In some computer systems, there may be more than two levels of page tables, with each level serving as an index to the next lower level until the lowest level page table maps a virtual page to a physical page.

Figure 2:
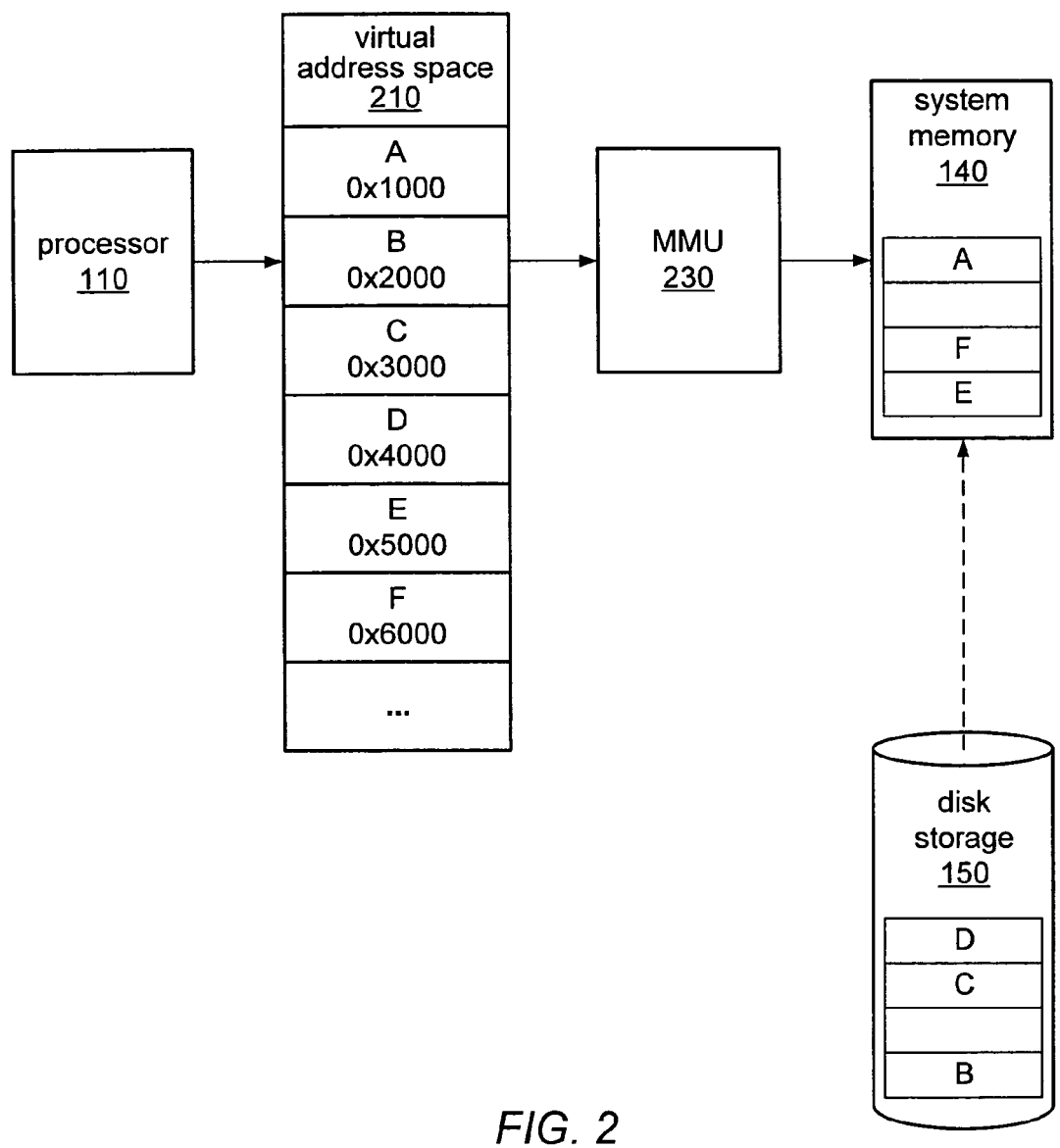
FIG. 2 illustrates one embodiment of a virtual memory system.

As previously noted, an application's virtual address space may exceed the amount of available physical memory, sometimes by a very large factor. Accordingly, only a certain portion of pages of virtual addresses can actually be accommodated in RAM 140 at any one time. The remaining pages then have to be stored externally, such as on disk storage 150. This is illustrated in FIG. 2, which shows processor 110 and also depicts the range of virtual addresses that are accessible by it. In this example, virtual address space 210 is split into pages A, B, C, etc. (Note that caches 120 and 130 are omitted from FIG. 2, since they are not relevant to an understanding of the paging mechanism.) In order to convert any given virtual address into its corresponding physical address, the memory management software first identifies the page containing the virtual address. It then utilizes a memory management unit (MMU) 230 to identify the current location of the corresponding physical page in system memory (RAM) 140 and to return the corresponding physical address.

At any given time, a desired (virtual) page may be physically located in disk storage 150 rather than in RAM 140, as illustrated in FIG. 2. Processor 110 may in some embodiments be unable to directly access data in external storage 150. In such embodiments, any attempt to access data not currently in RAM 140, such as data stored on physical page C shown in disk storage 150, may generate what is known as a page fault for the page containing the desired virtual address. In some embodiments, this may prompt the transfer of the relevant page from disk storage 150 to system memory (RAM 140) whereupon processor 110 may access it after address translation by MMU 230. For example, the data of page C may be copied into the empty page illustrated between pages A and F in RAM 140 and then may be accessed following translation to its physical address by MMU 230. Note that if RAM 140 is full when a new page must be added into it, then the system may be configured to delete an existing page from RAM 140 before adding a new page. In such embodiments, the system may be configured to copy the data of the page to be deleted to external storage (disk storage) 150 if it has been modified since being loaded into RAM 140.

A simple form of segmentation may involve a division between a code segment and a data segment. Segmentation may also be useful for setting properties of memory. For example, a code segment may be designated as read-only (once the code has been initially loaded into it), whereas a data segment may support both read and write access. While such access properties may be set at the page level, it may be more convenient to manipulate them on a block basis, according to the type of segment that a page belongs to. In some embodiments, memory management hardware or software may map the virtual address space of a particular process to a given segment of the physical memory, leaving the remaining portions of physical memory inaccessible to this particular process. In this way, address translation using segmentation may provide a minimal level of memory protection between processes, in such embodiments.

Figure 3:
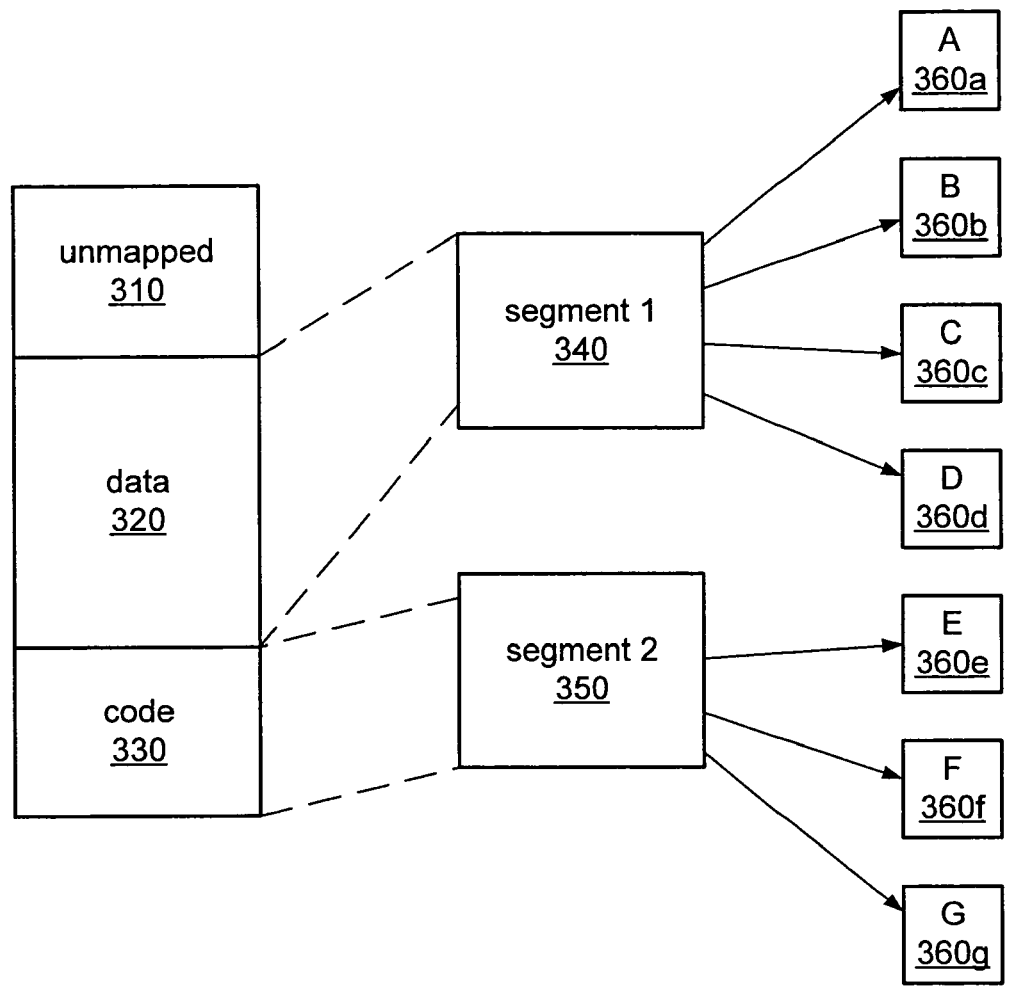
FIG. 3 illustrates segmentation in a virtual memory system, according to one embodiment.

The use of segments in memory virtualization is illustrated in FIG. 3, which depicts a virtual address space for a particular process. Each segment may be defined by three parameters: a virtual address, a physical address, and a segment size. In this example, the virtual address space contains two segments, one segment for process code 330, and one segment for process data 320. The remaining portion 310 of the virtual address space is unmapped, in this example. Each of the two segments is effectively treated as a separate block, with code segment 330 corresponding to segment 2 (350) and data segment 320 corresponding to segment 1 (340). In embodiments that combine segmentation with paging techniques, each segment block may include one or more pages 360. With segmentation, the hardware, such as an MMU, typically enforces different memory protection policies according to the nature of the segment. For example, any attempt to execute an "instruction" within data segment 320 would lead to an error, since this is not appropriate for this type of segment (but clearly would be permissible for code segment 330). Note that a segment may not be aligned to a particular boundary in memory, such as a page boundary, and may be of arbitrary size, in various embodiments.

In segment-based translation for virtual memory addressing, a segment table, usually managed by the operation system, may define the mapping between logical addresses and physical addresses, whether in main memory (usually dynamic RAM) or disk storage. An MMU may translate the logical addresses used in the software program into the physical addresses of the memory allocated to the program, based on the mapping in the segment tables. In some embodiments, the MMU may always output a physical address corresponding to main memory, rather than to disk storage. In such embodiments, a segment may need to be brought into main memory from disk storage before translation can be completed. The MMU may be a module of the processor, such as on the same integrated circuit device, or it may be a closely coupled auxiliary chip, according to various embodiments. In some implementations, segment-based virtual-to-physical address translation may simply involve adding a segment base address to a virtual address. This may be performed in an MMU, in some embodiments, while in others it may occur at another stage in the pipeline (e.g., during load/store address generation).

It will be appreciated that since processor 110 utilizes virtual addresses, the translation from a virtual address to the corresponding physical address should be performed as quickly as possible so as to provide the processor with fast access to the desired data. Therefore, most modern CPUs supporting virtual memory maintain a table of recently used virtual-to-physical translations, called a Translation Lookaside Buffer, or TLB, which effectively acts as a special purpose hardware cache for translation information from MMU 230. The TLB is typically a component of the MMU, but may in some embodiments be located elsewhere. An exemplary TLB is illustrated in FIG. 4. In this example, TLB 410 contains several pairs of virtual addresses and corresponding physical addresses. In each pair, the virtual address shown on the left is mapped to the physical address shown on the right. For a page-based translation technique, the page table and TLB may include the translations only for the highest order bits, those corresponding to a particular page of virtual and physical memory, respectively.

If an application requests access to a virtual memory address for which there is an entry in the TLB, address translation may occur without having to access a translation table, such as a segment table or page table. Using the example TLB of FIG. 4, if an application requests access to virtual address 312 (or a virtual address in which the highest order bits equal 312), it would be translated as a request to physical address 322 (or to the physical page with highest order bits equal to 322). The TLB can typically only store a fixed number of translations. If an application requests access to a virtual address that does not correspond to a current TLB entry, this is referred to as a "TLB miss." On a TLB miss, some action must occur to load the TLB with the required translation. On some processors, the MMU must access the appropriate translation table and load the translation into the TLB. This is often performed as a hardware-based table walk. On some processors, an exception (trap) occurs on a TLB miss, or if no valid translation is found following a hardware-based table walk. This may trigger the operating system to execute a trap handling routine, which may perform one or more software table look-ups and then may replace an entry in the TLB with the required translation from a translation table, before the instruction accessing that virtual address is restarted. Especially in embodiments employing multiple hierarchical levels of translation tables that may require multiple table accesses per translation, the hardware table walk and software trap-plus-table-look-up mechanisms represent a significant overhead for a memory access whenever an entry corresponding to the requested virtual address is not found in the TLB. Very large application programs and programs accessing very large data structures, which extend over a significant number of pages, may tend to overflow the TLB. For example, if an application accesses a lot of memory, there may be many different pages of memory accessed by the application. Thus, the page table may need to be very large to support all the appropriate mappings. If the page table is very large, there may a large number of entries to examine on a table-walk, which may take a long time, and/or the page table size may be larger than the available processor cache or TLB, in which case some page table entries may have to be accessed in the slower main memory. Such applications may be particularly prone to suffering from degraded performance due to the delays caused by having to access translations (portions of a page table) not currently stored in the TLB. Note that in some embodiments, the MMU always outputs a physical address corresponding to main memory, rather than to disk storage. In such embodiments, a physical page may need to be swapped into main memory from disk storage, as described above, before translation can be completed. In some embodiments, this page swapping may be initiated by a trap handler or by another component of the memory management software or operating system.

Note that a TLB is typically used for page-based virtual-to-physical address translation, but may also be used for segment-based translations when segments are aligned on address boundaries corresponding to N-bit boundaries (i.e., addresses in which all bits below the Nth bit are zero.) In cases where segment boundaries are arbitrary, a TLB may be less useful since the results of address translations are not as predictable or regular as those corresponding to segments aligned on N-bit address boundaries.

While prior art computer architectures use only a single technique to translate between virtual memory addresses and physical memory addresses for all processes and address ranges, a computer architecture may be configured to take advantage of processor support for multiple memory virtualization techniques, in some embodiments. For example, a computer system may be configured to employ one memory virtualization/translation technique with a given application and a different technique with a different, concurrently executing, software application. As used herein, the term "software application", or simply "application", may refer to any set of executable instructions that is distinguishable as an entity, such as a process, module, component or thread. An "application" in this context may not be limited to user-level code, but may in some embodiments correspond to more privileged code such as operating system code, driver code, etc. The term "concurrently executing", as used herein, may refer to two or more groups of instructions executing concurrently on the same processor (e.g., with execution of instructions from each of the groups interleaved), executing concurrently on multiple processors of a multi-processor system, or executing "virtually concurrently," such as if the groups of instructions execute serially, but without a reset or re-initialization of a processor (on which the instructions execute), an operating system (or other system-level software controlling the computer system on which the instructions execute), or an application (corresponding to one or more of the groups of instructions) between execution of the groups of instructions.

A computer architecture configured to concurrently employ multiple virtualization/translation techniques may be configured so as to reduce the overhead associated with memory virtualization, in some embodiments. In some embodiments, such architectures may improve overall performance by reducing this overhead, which, in some workloads, can consume a large percentage of the processor cycles.

As described above, a particular memory virtualization technique may be employed on a per-application basis in order to optimize performance, in some embodiments. In other embodiments, a particular memory virtualization technique may be employed on a per-thread basis. In still other embodiments, a particular memory virtualization technique may be employed based on a range of virtual or physical memory addresses or on the size of a data structure accessed by an application. For example, a different translation technique may be applied when accessing a few, relatively contiguous locations in an array smaller than the current page size than a technique applied when accessing more random locations in a large array implemented across multiple pages.

A memory virtualization technique may be selected or determined statically, such as when an application starts or at compilation, in some embodiments. For example, the technique may be determined based on an analysis of predicted memory accesses performed during compilation, or on a policy specified by the programmer. In different embodiments, the technique may be selected based on the size or complexity of one or more data structures used by the application, the regularity or randomness of memory accesses, the locality and size of available memory segments, the number or location of frequently accessed locations (hot spots), the number and location of frequently executed functions or subroutines, or any other criteria that may affect performance of memory accesses. In some embodiments, a compiler, operating system, or software diagnostic tool may be configured to determine an appropriate memory virtualization technique based on criteria such as described above. In other embodiments, a user or programmer may direct the computer's operating system and/or compiler to use a particular technique.

In addition to determining the translation technique, a compiler, operating system, diagnostic tool, or user/programmer may determine or specify page sizes, determine or specify particular mappings of virtual addresses to physical addresses, determine or specify a particular processor on which to execute an application or thread, determine or specify a particular block of physical memory to allocate to an application or thread, or may determine or specify other details of the memory virtualization technique according to different embodiments. For example, a programmer may direct the operating system, such as through compiler directives, to use the largest available page size, or to allocate a memory block of a given size that is close to a particular processor, for a given application. In other embodiments, a programmer, operating system, or software optimization tool may specify such details based on the performance of the application in a previous execution run, such as by analyzing the results of a performance monitor or software profiler.

When a memory virtualization/translation technique is determined statically for a given application or thread, the application or thread may employ that single translation technique throughout its execution, but other, concurrently executing, applications or threads may employ different techniques, as described below.

Hybrid Techniques

Since virtual memory addresses used by applications are translated to physical addresses transparently to the applications, not only may the translation mechanism map the application's virtual address space to arbitrary regions of physical memory but also, transparently to the application, it may employ a hybrid of different translation techniques, in some embodiments. Such hybrid address translation mechanisms may be constructed using an intersection or a union of multiple techniques, in different embodiments. A union of techniques may exploit different memory address translation techniques for different processes executing on a single processor, in some embodiments.

Different address translation techniques may be applied, for example, to different applications, as described above (i.e., one technique may be applied to the entire virtual address space of one application and another technique may be applied to the entire virtual address space of a second application.) In other embodiments, different techniques may be applied to different address ranges within a virtual address space (i.e., multiple techniques may be employed within the same application.) For example, the virtual addresses of an application's code (program instructions) may be mapped to a block or segment of memory using a page-based translation mechanism, while virtual addresses of an application's data structures may be mapped to a block or segment using segment-based translation. In other embodiments, different address translation techniques may be applied dependent on the range of physical addresses mapped to an application's virtual addresses, such as if different translation techniques are applied to different physical memory devices or sub-systems because of their specific hardware configuration. Different address translation techniques may also be applied to different components of a single software application, such as to different sub-routines, tasks, or functions of a user application or of operating system software, in some embodiments. In still other embodiments, different execution threads requesting accesses within the same address space may employ different address translation techniques.

In the case of an intersection of two techniques, the translation mechanism may first apply one technique to the application address, and then another technique to the result of the first translation. For example, a segment-based translation may be used to determine the physical segment mapped to the virtual address, and then page-based translation may be used to determine the particular page and offset of the specific physical memory location corresponding to the virtual address.

Union and intersection types of hybrids may be created either by using basic translation techniques or by using simpler hybrids to construct more complex hybrid techniques, according to various embodiments. For example, if the processor supports both page-based and segment-based memory address translation, the application address space (also called the virtual address space) may be divided into two address ranges: one using page-based translation, and the other one using segment-based translation. In this example, the application may use the page-based range for traditional code and data, providing full functionality of virtual memory such as copy-on-write sharing. Copy-on-write sharing is a technique in which multiple processes (or instances/threads of a process) may all access the same physical memory block until one of them attempts to modify the shared block. When this happens, a copy of the shared block is made and only that copy is modified. Segment-based address translation may be inefficient for copy-on-write blocks since the physical memory allocated to a particular one of the processes may become fragmented after one or more modifications to a copy of the shared block. Similarly, the application may use the segment-based range for very large data structures (for which page mode may result in a high overhead), in this example.

Figure 5:
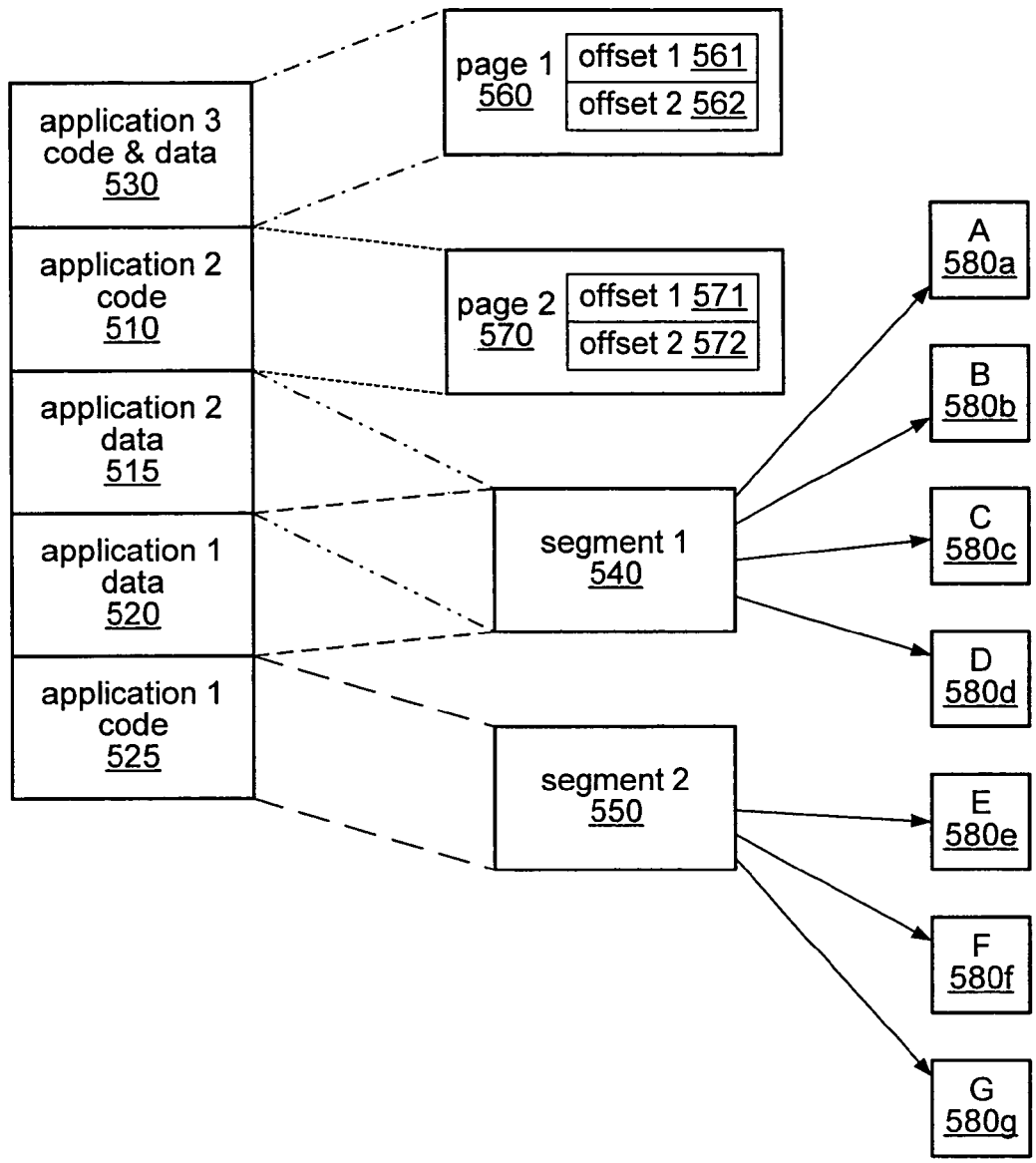
FIG. 5 illustrates one embodiment of hybrid memory virtualization.

An embodiment in which some accesses use segment-based address translation and others use page-based translation is illustrated in FIG. 5. In this example, application 1 uses segment-based translation. As shown in FIG. 5, the code for application 1 (shown as element 525) corresponds to segment 2 (element 550), while the data for application 1 (element 520) corresponds to segment 1 (element 540). Each of these segments is in turn made up of multiple pages 580. In some embodiments, segment 1 may be configured to support read-write accesses, while segment 2 may be configured as read-only.

In this example, application 3 uses page-based translation. As shown in FIG. 5, both the code and data of application 3 (element 530) are mapped to page 1 (element 560) of the physical memory space. Within page 1, two offsets are illustrated (elements 561 and 562). These offsets may correspond to the lower order bits of two virtual addresses within application 3's code or data, in some embodiments. In other embodiments, they may correspond to the lower order bits of virtual addresses within another application's code or data.

Application 2, in this example, uses two different address translation techniques. As shown in FIG. 5, the code of application 2 (element 510) is mapped to page 2 of the physical memory space (element 570). Within this page, two offsets are illustrated (elements 571 and 572). In some embodiments, these offsets may correspond to the lower order bits of two virtual addresses within application 2's code. In other embodiments, they may correspond to the lower order bits of virtual addresses within another application's code or data.

In this example, the data for application 2 is also mapped to segment 1 (element 540). Segment 1 is, in this example, made up of multiple pages 580, although segments in general may also correspond to contiguous regions of unpaged memory. In some embodiments, segment 1 may be configured to support read-write accesses.

Figure 6:
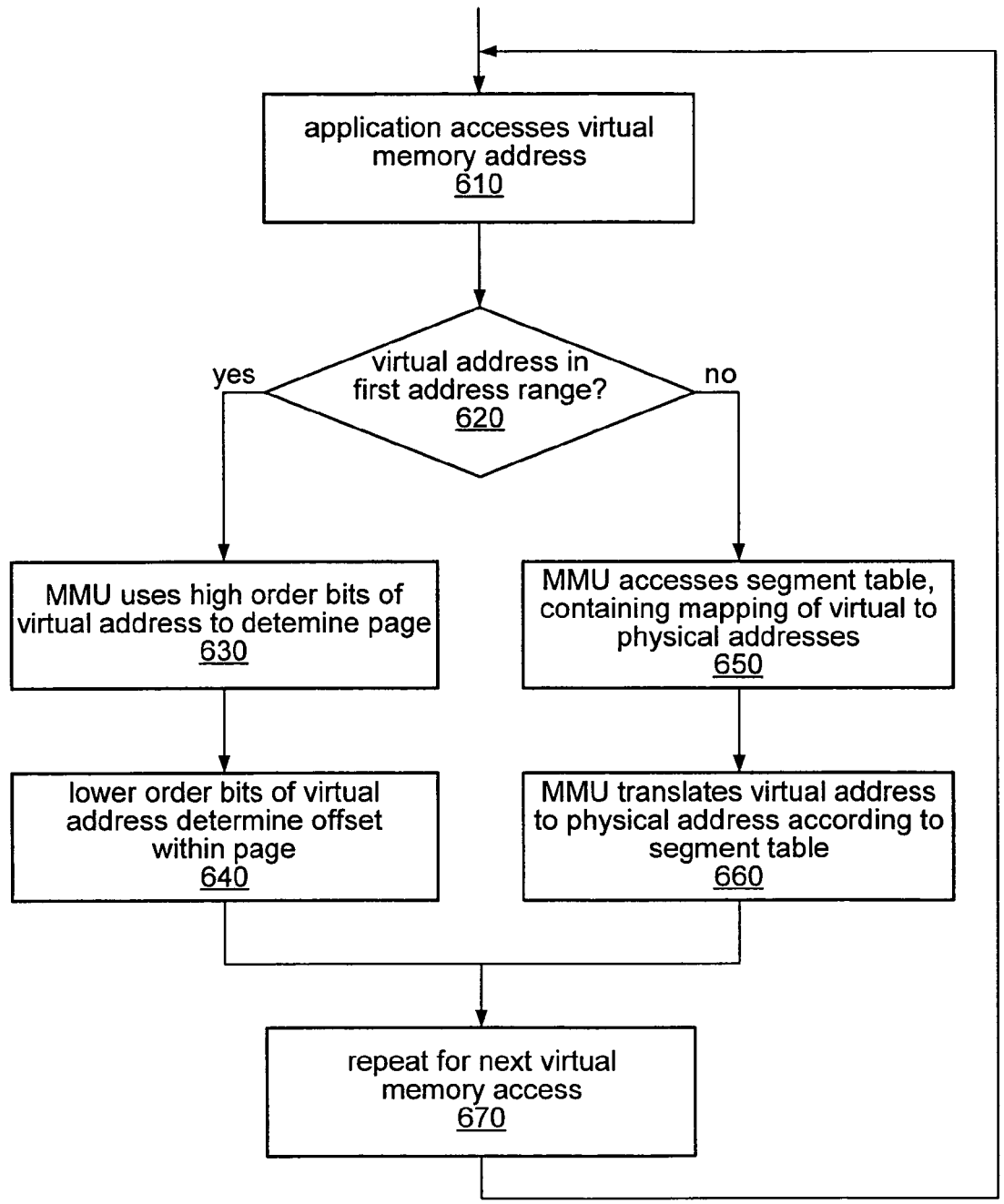
FIG. 6 is a flow chart illustrating the union of two memory virtualization techniques, according to one embodiment.

An exemplary method of translating virtual memory addresses to physical memory addresses using a hybrid technique is illustrated by the flow chart in FIG. 6. In this example, an application requests access a particular virtual memory address, as in 610. The virtual memory address may first be compared to a range of addresses to determine the appropriate translation technique, as in 620. In some embodiments, the virtual address may be compared to two or more different address ranges to which respective translation techniques apply. In this example, if the virtual address is within a first range of interest, it may be translated according to a page-based technique, as in 630. If the virtual address is not within this range, as in 650, it may be translated according to a segment-based technique.

If the virtual address is to be translated using a page-based translation, as in 630, an MMU may use the high order bits of the virtual address to determine the page of physical memory corresponding to the virtual address. The number of bits used to determine the page may be dependent on the size of the pages and the size of the addressable memory space. Once the appropriate page has been determined, the MMU may use the lower order bits of the virtual address to determine the offset of the physical memory location within the determined page, as shown at 640.

If the virtual address is to be translated using segment-based translation, the MMU may access a segment table containing a mapping of virtual addresses to physical memory segments, as shown at 650. The MMU may then translate the virtual address to a physical address according to the mapping in the segment table, as in 660. Each segment may, in turn, include multiple pages of physical memory and may be of any arbitrary size, according to various embodiments.

This translation process may then be repeated for the next virtual memory request, as shown at 670. In some embodiments, the operations described in this example as being performed by an MMU may instead be performed by a processor, by memory management software, by an operating system, or by any combination of standard or specialized hardware and software supporting multiple virtualization techniques and implementing a virtualization technique selector and a virtual-to-physical address translator. As described herein, using a hybrid mechanism for memory virtualization may result in different address translation techniques being used for various memory accesses by a single application, for memory accesses of different applications or threads, or for accesses to different memory ranges.

While the examples of hybrid translation techniques described above involve a combination of page-based and segment-based address translations, hybrid translations may involve any combination of memory virtualization and corresponding virtual-to-physical address translation techniques. For example, in some embodiments, page-based or segment-based address translation may be employed along with a function-based address translation technique, as described later, or with any other hardware or software based virtual-to-physical address translation technique. In other embodiments, a hybrid of "different techniques" may encompass different configurations or variants of a single basic translation technique or of similar techniques. For example, a hybrid technique may use one type of page-based translation for a first application or memory region and another type of page-based translation (e.g., one using a different page size or separate page table) for a second application or memory region. Similarly, a hybrid technique may employ one function for a first set of address translations and another function for a second set of address translations, as described below.

The use of hybrid translation techniques, as described herein, may provide better scalability than any single technique, in some embodiments. Hybrid techniques may in some embodiments be very cost effective since it may be possible to implement a combination of techniques largely in software without making hardware changes.

Dynamic Selection of Techniques

A computer system may be configured to select a memory virtualization technique dynamically, during application execution, in some embodiments. This dynamic selection may, in some embodiments, be based on the output or results of a performance monitor or software profiler. For example, a profiler may consider the pattern and frequency of virtual memory accesses by the application at any given point of execution and may determine that a different technique may be more efficient for those accesses. In some embodiments, the technique employed for address translations may change throughout the execution of the application, as the characteristics of the application's workload changes. Since the pattern and frequency of virtual memory accesses by the application may change substantially during execution, dynamic selection of a memory virtualization/translation technique may result in an overall improvement in performance compared to the use of a single translation technique, in some embodiments.

Dynamic selection of a memory virtualization/translation technique may allow for adjustment of the translation technique during application execution to reduce the overhead of address translation, in some embodiments. In some cases, such adjustment may include optimizing the currently employed technique. For example, a profiler or other operating system component may determine that overhead may be reduced by changing the page size used by a particular application or thread or by reorganizing the physical memory allocated to a particular application or thread to increase contiguity. In other cases, overhead may be reduced by changing memory virtualization/translation techniques. For example, a profiler or other operating system component may determine that an application may execute with reduced overhead if it moves from page-based translation to segment-based translation, or vice versa, based on whether an observed pattern of memory accesses indicates that the application accesses memory at virtual addresses randomly distributed within a large range of addresses or to a largely contiguous set of addresses within a smaller range of virtual addresses. In some embodiments, a user policy may be applied to determine when it is appropriate to dynamically change translation techniques. For example, a user policy may be used to set a threshold for a particular measurement by a profiler or performance monitor, such as the number of TLB misses detected in a given time period, that would trigger an analysis of the currently employed translation technique.

The criteria for determining if and when to change memory virtualization or translation techniques may be related to measurements of address translation overhead. As described above, these measurements may include counting the number of TLB misses in a certain time period, in some embodiments. For example, some processors that support virtual memory include a counter that increments on a TLB miss. In systems with these processors, the operating system, or profiling software, may examine this counter periodically in order to analyze the performance of the application using the current translation technique. In other embodiments, the number of TLB misses may be determined by measuring the number of times a trap handler is executed or by measuring the number of translation table accesses in a given period. If the number of TLB misses (or other relevant measurement) in the period reaches a certain threshold, the operating system may be configured to analyze the performance measurements and to select a translation technique more suitable for the application's particular memory accesses, in some embodiments. In other embodiments, the operating system may be configured to continue monitoring the TLB miss count (or other relevant measurement) until or unless the measurement remains over the threshold for a given number of periods before making any changes. In still other embodiments, if the measurement drops back below the threshold during the observation period, the operating system may be configured to maintain the status quo, but to continue profiling.

In an alternate method for determining the overhead of a particular address translation technique, an operating system may be configured to measure how long the processor waits for memory when each virtual memory location is addressed. For example, the operating system may be configured to monitor the performance of load/store operations by checking counters to determine the length of loads and stores. The time it takes to access physical memory on a load or store operation may be related to both the distance from the processor to the memory (locality) and the address translation overhead. In some embodiments, the operating system may be configured to reorganize or reassign the physical memory allocated to a process (and to reorganize the related mapping tables) to improve locality, and thus, access time. For example, in a distributed computer system having multiple nodes, the physical memory allocated to a particular process may be local memory (i.e., located on the same node as the processor on which the process executes), may be on a nearby node (e.g., one located within a few network hops from the processor node) or may be on a more remote node (e.g., one located many network hops from the processor node). In such embodiments, the operating system may be configured to copy instructions and/or data from one or more blocks of physical memory currently allocated to the process to one or more larger, more contiguous, or nearer blocks of physical memory and to allocate these other blocks to the process instead. The newly allocated blocks may, in some embodiments, be located on a different memory device or may include different physical blocks of memory on the same memory device as the previously allocated blocks.

In some embodiments, the operating system, or other profiling software, may be configured to determine how long it would take to reorganize the physical memory in order to reduce address translation overhead, such as by estimating the time it would take to copy instructions and/or data from currently allocated physical memory to one or more different physical memory blocks and to repopulate one or more translation tables to reflect the mapping changes. In such embodiments, the operating system may also be configured to determine whether or not the current translation technique should be changed based on a balance between how long it would take to reorganize the memory and the amount of overhead incurred by the current address translation technique (e.g., how often a TLB miss is encountered.)

Various methods may be employed to implement dynamic determination of a virtual-to-physical address translation technique. In some embodiments, a performance monitor or profiler may detect that a particular performance measurement (e.g., TLB misses or average memory access time) is out of specification or above/below a given threshold. In such embodiments, the monitor or profiler may trigger an analysis of the performance of the application using the current translation technique and the operating system may be configured to determine if another technique would work better for the particular application, thread, or address range in which a problem was detected. For example, if an application or thread employs page-based translation, and the average memory access time rises above a given threshold, the operating system may analyze the pattern of virtual memory addresses accessed by the application or thread. If the pattern indicates that the application accesses a tightly distributed set of virtual addresses that cross a page boundary, for example, the operating system may calculate a translation function for the application, as described below. In this example, the operating system may be configured to estimate the average memory access time for the application using the translation function, assuming the translation function remains in local cache during execution of the application. If the estimated average memory access time using the function is less than the current average memory access time, the operating system may be configured to employ the function for virtual-to-physical address translation rather than one or more page tables.

In some embodiments, if the operating system determines that a different memory virtualization technique may be more efficient for the executing application, it may be configured to stop execution, recompile the application to employ a different technique, and restart the application. In some such embodiments, this may be transparent to users of the application. In other embodiments, the operating system may be configured to employ a different memory virtualization technique without stopping, recompiling, and restarting the application, such as by suspending operation or holding off memory accesses while changing techniques.

The operating system may, in some embodiments, be configured to dynamically reorganize the memory in order to reduce translation overhead. In one such embodiment, the operating system may change the page size used by the application. In another embodiment, the operating system may allocate a different block of memory to the application, e.g., to allocate a larger contiguous block or a block located nearer to the processor. The operating system may also perform a de-fragmentation of memory in order to create a larger contiguous block for an application, in some embodiments. In these examples, the operating system may also reorganize the appropriate mapping tables to reflect this reorganization. For example, in some embodiments, reorganizing the mapping tables may include repopulating them with new mappings for one or more individual virtual addresses. In other embodiments, reorganizing the mapping tables may involve changing one or more page sizes or segment sizes and updating the entries in the tables to reflect the boundaries of the new pages or segments. In still other embodiments, a change in the organization of memory may result in a different number of mapping tables, in replacing one or more page tables with one or more segment tables (or vice versa), or in dispensing with one or more mapping tables altogether, such as if a function-based translation replaces one or more mapping tables. In some embodiments, the operating system may not need to recompile or reinitialize an application or the processor on which it runs when reorganizing the memory or changing translation techniques. Instead, the operating system may be configured to suspend execution of the application or to hold off accesses to the application's virtual address space while such changes are in progress.

In various embodiments, the operating system may dynamically select and employ any combination of the memory reorganization techniques and translation techniques described above or may adjust any other component of virtual-to-physical address translation in order to reduce translation overhead or otherwise improve performance of an application's memory accesses. Similarly, the operating system may, in some embodiments, be configured to dynamically select a hybrid translation technique, such as those described herein. In such embodiments, the operating system may dynamically select and employ any combination of address translation techniques to different applications or to different virtual or physical address ranges, according to profiling results, user policies, or other criteria.

Since the choice of the translation technique may be transparent to the application, the selection may be performed for the entire application, in some embodiments, or for the individual threads or routines within a single application, in other embodiments. For example, if a given computer architecture supports page-based translation, segment-based translation, and function-based address translation, the operating system may be configured to monitor translation overhead of individual threads or routines. The operating system may, in some embodiments, be configured to switch to page mode when an application thread or routine has a good locality (i.e., when page-based translation may be efficient) or when mappings change frequently (i.e., when segment-based translation may be inefficient). Similarly, when an application thread or routine accesses a very large virtual address space (i.e., when page mode may be inefficient) the operating system may change the thread's translation technique, transparently to the application, to segment-based translation, reducing the translation overhead. In other cases, a translation function, such as described below, may be used to reduce address translation overhead.

While the profiling techniques disclosed herein are described above as being implemented within the operating system software of a computer system, in some embodiments any profiling functionality ascribed to the operating system may instead be implemented in hardware within the processor itself, the MMU, or elsewhere. Similarly, a virtualization technique selector and address translator, implementing the functionality described herein for dynamically selecting a virtualization technique and translating virtual addresses to corresponding physical ones, may be implemented within the operating system or in hardware within the processor, MMU, or elsewhere. As with the hybrid translation techniques previously described, these dynamic translation techniques may be applied to privileged code, such as various components of an operating system (e.g., daemon processes), as well as to user-level code.

Figure 7:
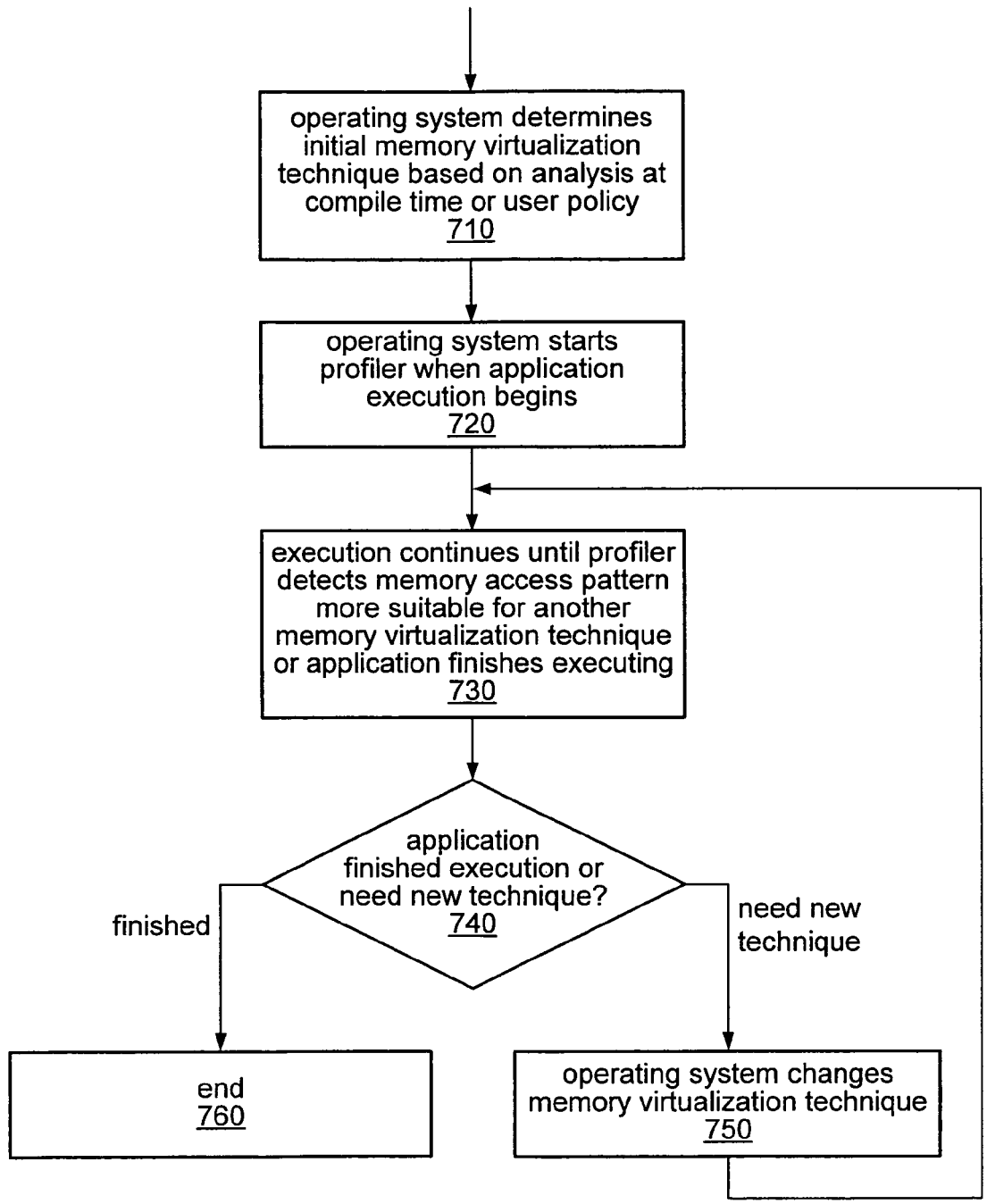
FIG. 7 is a flow chart illustrating one example of a method for dynamically determining a memory virtualization technique.

One method for dynamically determining a virtual-to-physical address translation technique is illustrated by the flow chart in FIG. 7. In this example, the operating system is configured to determine an initial address translation technique for an application before beginning execution of the application. As illustrated at 710, this determination may be based on an analysis of predicted virtual memory accesses done at compilation, or may be based on a user policy or received user input, as described above. In some embodiments, the computer system may include a default address translation technique for all applications.

When the application begins execution, in this example, the operating system may also start a profiling program, as in 720. This profiling program may continuously or periodically monitor various indicators of memory access performance and virtual address distribution, as described above. For example, such a program may monitor the number of TLB misses in a given time period, may determine how long memory accesses are taking (individually or as an average, median, or other statistically significant measurement), or may gather data regarding the number of accesses to various memory locations, such as to identify hot spots or frequently executed routines.

The application may continue execution, as shown in 730, until one of two things occurs, either the application finishes execution (because of an error or by completing normally), or the profiler detects that the initial address translation technique is not performing up to a given standard. For example, the profiler may detect that the number of TLB misses is above a particular threshold, in some embodiments. In another example, the profiler may detect that the current page size is contributing to high translation overhead, such as if the page size is too small and not all of the pages accessed by the application will fit in the page table. In yet another example, the profiler may determine that the time it would take to reorganize the memory (e.g., by copying code or data to a larger contiguous block) and/or change to a different translation technique (such as segment-based rather than page-based translation) is less than the amount of extra overhead incurred by the current memory organization and translation technique.

If the application completes execution, the dynamic method for selecting a translation technique is also complete, as in 760. If the profiler determines that the application's pattern of virtual memory accesses may be better suited for a different memory virtualization/translation technique, as in 740, the operating system may be configured to analyze the output of the profiler and to make the necessary changes to reduce translation overhead, as in 750. These changes may include any of the changes described above, combinations of these changes, or any other combination of these and other changes operable to reduce address translation overhead, in different embodiments.

Once the operating system has dynamically selected and employed a different address translation technique, execution and profiling of the application may continue, as in 730. For example, the profiler may continue to examine the number of TLB misses over time and may detect that the application's behavior has changed, resulting in an increase in TLB misses. In this case, the operating system may be configured to analyze the output of the profiler and to implement another change to the translation technique. In some cases, the application's workload may resemble its initial workload, or another previous condition, and the operating system may be configured to reverse the changes it made, such as to increase a previously decreased page size or revert to page-based translation after changing from page-based to segment-based translation. In other cases, the application's workload may be different than a previous condition and different changes may be implemented.

In another example, an application may be executing using page-based translation, and may be experiencing a large percentage of TLB misses. The application may have started execution with a large, contiguous memory block allocated to it, but after some number of copy-on-write operations, the physical address space mapped to that application's virtual address space may have become fragmented. Therefore, the physical memory accesses may now be to a wide range of addresses in non-contiguous locations in the physical memory. In some embodiments, the operating system may analyze the application's pattern of virtual memory accesses and may reorganize the physical memory, and therefore the virtual-to-physical mappings, to provide the application with more contiguous memory accesses. In some embodiments, this analysis, reorganization and remapping may take place while the application continues to run, with the operating system performing its tasks in the background. In such embodiments, the operating system may need to suspend operation for a short time or to hold off accesses to certain virtual and physical memory addresses to maintain data coherency while the reorganization and remapping take place. In other embodiments, the operating system may be configured to stop execution of the application and may recompile the application or reinitialize or restart it after completing its analysis and its reconfiguration tasks. In this example, the operating system may keep the application executing with page-based translations after reorganizing the memory or may migrate the application to a different translation technique if it is determined that it is likely to be more efficient for the application's current workload.

Note that in different embodiments, changing memory virtualization and address translation techniques during execution of a software application may or may not result in changing the mapping from a given virtual address to a corresponding physical address. Therefore, in some embodiments, the physical address determined by an address translator for a given virtual address according a first virtualization/translation technique may be the same as the physical address determined by an address translator for the given virtual address according to a second virtualization/translation technique. For example, a second translation technique may use the same virtual-to-physical mappings as a first technique, but may use a different page size for the virtual and/or physical address space. In another example, a function-based translation technique may replace a table-based translation technique, but may calculate the same physical address for a given virtual address as the physical address found in a translation table before changing translation techniques. In other embodiments, changing memory virtualization and translation techniques during execution of a software application may result in different mappings between virtual and physical addresses. For example, if a memory is reorganized to reduce fragmentation and/or a different block of memory is assigned to the application that is larger and/or more contiguous, some or all of the mappings of virtual-to-physical addresses after the reorganization and reallocation may be different than the previous mappings.

As described above, dynamic selection and employment of various memory virtualization/translation techniques may, in various embodiments, provide run-time optimizations that may be applied to any virtualization mechanisms, and may provide improved performance through a reduction in virtual-to-physical address translation overhead based on an application's changing workload.

Function Based Translation

As described above, processors that support memory virtualization often include a Translation Lookaside Buffer, or TLB, that stores virtual-to-physical mappings of recent translations. The TLB may be located in the processor's cache, such as an L1 or L2 cache or may be implemented in specialized hardware in the processor or MMU (e.g., a content-addressable memory, or CAM), for this purpose, in different embodiments. If an application accesses a large virtual memory space, such as one spread over a large number of pages, the TLB may not be large enough to hold very many of the virtual-to-physical address mappings needed by the application.

As previously described, using current processors, when a TLB miss occurs for a given virtual address, some action must be taken before the virtual address can be translated to a physical one. On some processors, an MMU must access the appropriate translation table, whether in local memory (e.g., system memory or RAM 140) or non-local memory (e.g., disk storage 150) and load the translation into the TLB. This may be performed as a hardware-based table walk, in some computer systems. In other computer systems, the MMU may generate an exception (trap) in response to a TLB miss and the operating system may execute a trap handling routine, which performs a software table look-up in order to load the TLB with the required translation. If an application accesses a large virtual address space, it may "miss" often, and spend a lot of CPU cycles trapping, walking (accessing multiple entries in) one or more translation tables, reloading the TLB, and continuing. This may be especially true if the memory accesses of the application are to somewhat random, rather than contiguous, addresses within the application's virtual address space.

A mechanism for generating new address translations without accessing a translation table and performing a software table look-up or hardware table walk may in some embodiments reduce translation overhead associated with a TLB miss. In some embodiments, a trap handler may include program instructions to generate a new address translation without accessing a translation table in memory. In such embodiments, the trap handler may include a computed function that takes a virtual address as an input and generates the corresponding physical address mapped to that virtual address as an output. This computed function may be implemented in software, such as in a routine invoked by the operating system, in some embodiments. In other embodiments, this function may be implemented in hardware, or a computer system may include hardware support for a software implementation of function-based translation. For example, a processor, co-processor, or MMU may include circuitry configured to implement a translation function in a state machine or in combinational logic, in some embodiments.

On any given virtual memory access, a processor may first check the TLB to see if there is an entry for that virtual address, in some embodiments. If there is not an entry corresponding to that virtual address (i.e., there is a TLB miss), the processor may jump to a trap handler routine. In some embodiments, if there has been a context switch, the operating system may have provided a pointer to an alternate page table, or may have flushed (i.e., emptied) the TLB. Either of these actions may result in TLB misses for the new context, in some embodiments. A context switch may in some embodiments provide an opportunity to preload the TLB using a function (i.e., to prevent misses from occurring), in some embodiments.

The trap handler code may be configured to check one or more page tables for the virtual address of interest and if the mapping is not found (i.e., the virtual address is not in the table or the corresponding physical address is empty), may jump to a virtual-to-physical address translation function to provide a new TLB entry, in some embodiments. In other embodiments, the operating system may be configured to skip checking a page table at all, such as by switching off the hardware table walk routine described above. In still other embodiments hardware may be configured to bypass checking the TLB or accessing a page table and cause a trap directly to a translation function. In some embodiments, if a given translation function is executed often and is small enough, it may remain in a processor cache (such as L1 120 or L2 130) where it may execute faster than if it is fetched from system memory or non-local memory each time it is run.

A trap handler including a translation function may replace generic trap handler code that executes one or more translation table walks, in some embodiments. This translation function may be computed by the operating system, in some embodiments. For example, the operating system may be configured to identify the structure of one or more page tables, to simplify them (if possible), and to generate and compile new trap handler code including one or more functions for translating virtual addresses to physical ones. In some embodiments, once it is compiled, the replacement function code may execute faster than the generic trap handler it replaces. The replacement function may include more program instructions than a generic trap handler it replaces, in some embodiments, but may execute in many fewer cycles than a generic trap handler that includes one or more table look-ups, accessing one or more translation tables in system memory or other non-local memory. For example, an algorithm to describe the translation implemented by a page table may execute in only a few cycles out of the processor cache, while searching a table in non-local memory may take many cycles for each table entry accessed.

In some embodiments, one translation function may be used for all translations if, for example, all the page sizes are the same and the virtual-to-physical mappings are simple. In other embodiments, the new trap handler code may include different functions for translating different regions of the virtual memory space, such as if page sizes and mappings are different in different memory regions, or multiple trap handlers may be implemented, each of which includes one or more translation functions. Replacing a generic trap handler routine and table look-ups/walks with a replacement translation function may, in some embodiments, be most efficient when replacing large page tables that do not change often and/or when applications access large block(s) of memory without paging, but with largely contiguous virtual-to-physical mappings.

Figure 8:
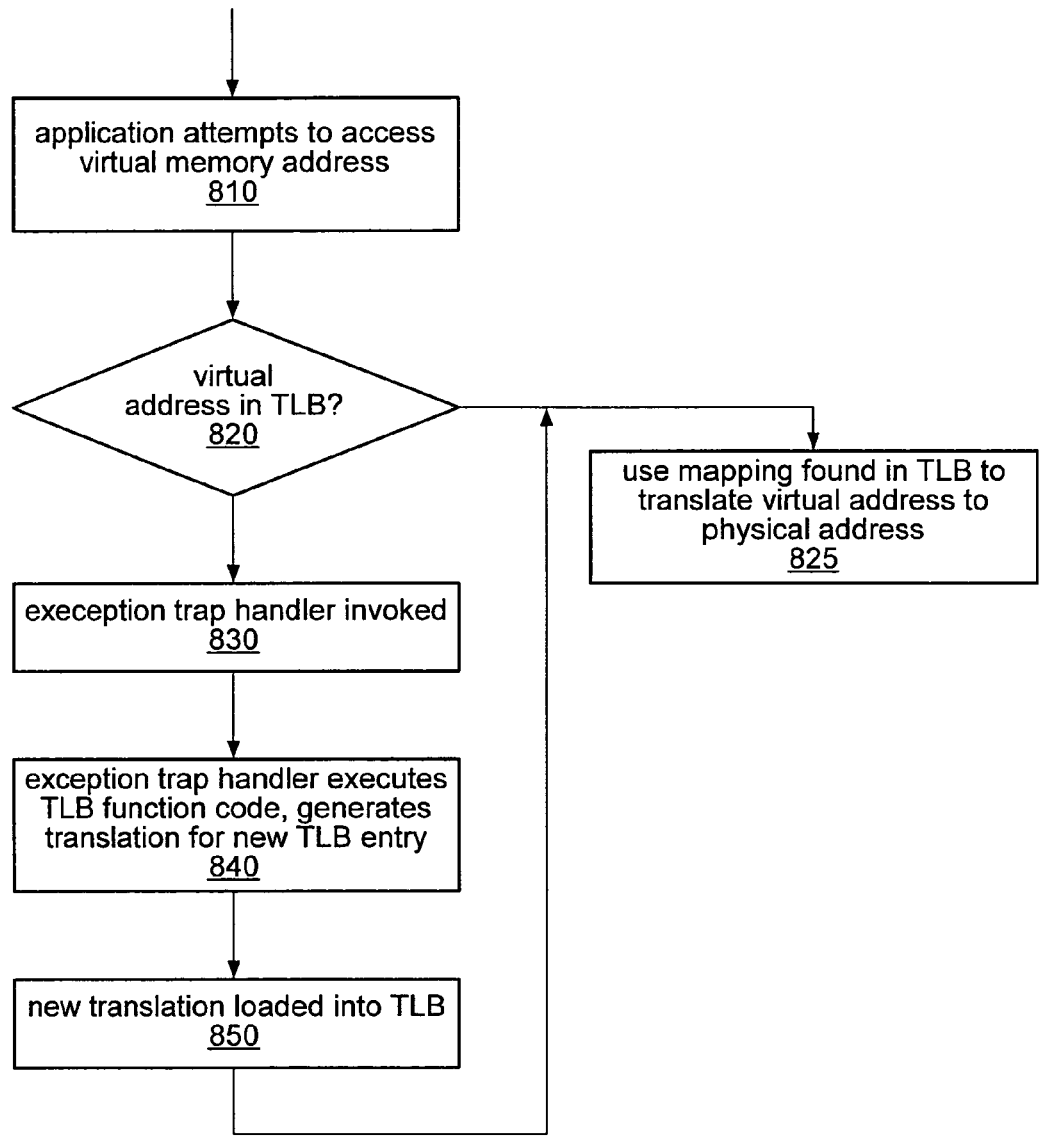
FIG. 8 illustrates a method for translating virtual addresses to physical addresses using a translation function, according to one embodiment.

An exemplary method for translating a virtual address to a physical address using function-based translation is illustrated in the flow chart of FIG. 8. In this example, an application requests access to a particular virtual memory address, as shown at 810. The processor may, in some embodiments, check the TLB for the current mapping for the particular virtual address, as shown at 820. If the TLB includes an entry for the particular virtual address, that entry may be used to translate the particular virtual address to the appropriate physical address, as in 825.

If the TLB does not include an entry for the particular virtual address, an exception may be generated and a trap handler may be invoked, as shown at 830. The trap handler may, in some embodiments, include program instructions configured to compute the virtual-to-physical address translation for the particular virtual address without accessing one or more translation tables. The trap handler code may be located in system memory, such as in RAM 140, in some embodiments, and may be a component of the operating system software running on the computer system. In other embodiments, the trap handler code may be implemented in microcode, firmware or hardware.

The trap handler may execute program instructions to generate a new TLB entry for the particular virtual memory address, as shown at 840. In some embodiments, different trap handlers may be invoked depending on the address range of the particular virtual address, the application or thread requesting access to the particular virtual address, or the type of access and corresponding access rights of the process requesting access to the particular address (such as a read-write access to a data segment or a read-only access of a code segment). In other embodiments, a single trap handler may be invoked, and may include one or multiple functions for generating a TLB entry, depending on the virtual address to be translated.

The new TLB entry may be loaded into the TLB, as shown at 850. Generating a new TLB using a function as described above and loading it into the TLB may, in some embodiments, take significantly fewer CPU cycles than executing a generic trap handler, walking one or more translation tables, and loading the TLB with a copy of an entry from one of the translation tables. Once the TLB is loaded, program flow may be returned to the application from the exception routine and the new entry may be used to translate the particular virtual address to the appropriate physical address, as in 825.

By embedding the virtual to physical address mapping in a computed function that is a part of the trap handler for a TLB miss, the overhead of accessing and searching one or more translation tables in local or non-local memory may be avoided, in some embodiments. This is especially true when a relatively large number of CPU cycles may be able to be executed in the time necessary to perform a single memory access, in some embodiments. Therefore, replacing generic trap handling code and one or more table look-ups with a routine to compute virtual-to-physical address translations may reduce the number of CPU clock cycles consumed by a memory reference which results in a TLB miss, in some embodiments. The benefits may be magnified by regularities in the physical locations accessible by a process, in some embodiments.

The following example illustrates the use of function-based translation between virtual addresses and physical addresses. In this example, an application's virtual address space is mapped to two segments, one for code and one for data. The application's code segment starts at virtual address X1 and is of size S1. The application's data segment starts at virtual address X2 and is of size S2. If two contiguous segments of physical memory are mapped to the two virtual segments, in this example, a simple function may be able to translate the application's virtual addresses to physical ones. For example, if the code segment is mapped to physical memory beginning at address A1 and the data segment is mapped immediately following the code segment, beginning at address A1+S1, a function made up of two different mapping expressions may be used to translate all the addresses in the virtual address space of this application. In this example, if a virtual address Y is between X1 and (X1+S1), i.e., if it is in the segment containing the application's code, the function to translate the virtual address may be as follows:

physical address=$A1+(Y-X1)$

Similarly, if a virtual address Z is between X2 and (X2+S2), i.e., if it is in the segment containing application's data structures, the function to translate the virtual address may be as follows:

physical address=$(A1+S1)+(Z-X2)$

As shown in the example above, a function to replace a standard trap handler routine executing a table walk in physical memory may consist of one or more of these 1-to-1 mapping functions, joined, for example, by one or more "if, then, else" statements. In some embodiments, physical memory may be broken up into segments of the same size as corresponding virtual memory segments, while in others it may not be. Note that a function similar to the one described above may be suitable for translating virtual memory addresses in segments of arbitrary size in addition to segments allocated to a process or thread on page-size boundaries. If physical segments mapped to an application's virtual segments are not contiguous, a similar function may be constructed including more "if, then, else" statements to determine which 1-1 mapping function to apply, in some embodiments. Also note that if the physical memory mapped to the virtual address space of an application is not contiguous, the user, programmer, or operating system may elect to reorganize the memory to increase contiguity before computing a translation function, in some embodiments. This may, in some embodiments, allow a simpler function to replace a generic trap handler plus one or more table walks to compute an address translation than if the allocated physical memory is less contiguous.

More complex virtual-to-physical address mappings may require arbitrarily complex replacement functions, in some embodiments. In various embodiments, such functions may include combinations of additions and/or subtractions, multiplications and/or divisions, modulus operations, shifts, rotations, or any other arithmetic or logical operations needed to translate virtual addresses to physical ones, depending on the virtual-to-physical memory mappings. In some embodiments, mappings are deliberately irregular, e.g., to avoid hot spots as described below. In other embodiments, the majority of accesses are regular, but a small percentage is not. In any of these embodiments, there may be simple mapping functions for some applications, threads, or addresses ranges and more complex mapping functions for others. Note that the use of more complex translation functions may approach the same overhead as one or more translation table walks, in some embodiments. Therefore, if a goal of a particular replacement mapping function is to reduce address translation overhead, the performance may benefit from the memory being reorganized to simplify the mappings before computing a translation function. In some embodiments, translations for relatively regular mappings may be replaced by a translation function, while translations for more complex mappings may employ a traditional table-based translation, resulting in a hybrid translation technique as described above.

An operating system may be configured to analyze one or more mappings of virtual addresses to physical ones for a given application, thread, routine, or virtual address range and to compute one or more functions to replace a generic trap handler and one or more translation table look-ups, in some embodiments. As described above, a method for implementing function-based address translation may include deliberately reorganizing memory or simplifying virtual-to-physical memory mappings in order to be able to replace these mappings with one or more simple functions. In some embodiments, the operating system may be configured to compute one or more replacement translation functions if a translation table or TLB is too large to fit in a processor's caches or main memory. In other embodiments, the operating system may be configured to compute one or more replacement translation functions if performance measurements, such as those discussed above regarding dynamic selection of translation techniques, indicate that the current translation technique results in high overhead. For example, the operating system may be configured to implement function-based translation if an application has a high percentage of TLB misses, but is already using the largest allowable page size.

Subsequent to replacing a generic trap handler and translation table walk with a replacement function, the operating system may be configured to monitor the number and frequency of replacement function calls and TLB misses to determine if the use of the function has reduced the overhead associated with virtual-to-physical address translations, in some embodiments. If the workload changes such that the replacement function is not needed anymore (i.e., if the number of TLB misses drops and/or the replacement function is not called very often), the operating system may be configured to return to a default or other previous translation technique. In other embodiments, the operating system may be configured to analyze the address translation overhead continuously or periodically and to change translation techniques or to modify the allocated memory configuration whenever the application's workload changes. In one embodiment, the operating system may be configured to compute a different translation function and to replace a current translation function with this new translation function in response to a change in the application's workload.

As mentioned above, in some applications, the use of contiguous memory may not be desirable. For example, to avoid creating a "hot spot", it may be desirable to deliberately stride or hash mappings between virtual and physical memory to avoid writing to the same location(s) over and over. In some embodiments, multiple translation functions may be used to map a "hot spot" virtual address to different physical addresses, such as for each thread. In some embodiments, only accesses to these "hot spots" may use function-based translation, while other instruction and/or data accesses may use a traditional translation technique. For example, the majority of the application's accesses may be mapped regularly and may be the same for all threads, while only the accesses to hot spots are different for each thread.

An operating system may be configured to analyze an application during compilation or execution and to do work up front to reorganize (and/or simplify) the application's virtual-to-physical address mappings, and to compute and compile a translation function to replace generic trap handling code, in some embodiments. In such embodiments, this up-front work may be used to optimize an application for future performance and may be offset by a reduced overhead of address translations, especially if the application will execute for a long time relative to the time it takes to reorganize the memory, and to compute and compile the replacement function.

If an application is experiencing a large number of TLB misses, a combination of the techniques described above may be employed to reduce the overhead associated with translations from virtual to physical addresses, in some embodiments. For example, if the virtual address space to be accessed by one application is very large, but accesses will not be to contiguous or regularly mapped locations, the operating system may organize the virtual-to-physical mappings for that application's allocated memory in such a way as to make the accesses more contiguous and/or regular. If the address translation overhead is within an acceptable range for some period of time, but the application exhibits high translation overhead later, one or more of the techniques described herein may be applied dynamically to reduce the translation overhead of the application as it executes. For example, the operating system may dynamically replace the standard trap handler with a function-based trap handler, as described above. In this example, the operating system may reorganize the application's allocated memory again later (if it becomes fragmented as the application executes) and/or may compute one or more new translation functions to reflect changes in the memory organization as execution continues. In another example, the operating system may change the page size or may move from page-based translation to segment-based translation, and vice versa, for this application at different points in its execution.

If only a single application executing on a processor is experiencing high address translation overhead, or is dominating the translation overhead for a group of applications, the techniques described herein may be applied, individually or in combination, only to that application, in some embodiments. In such embodiments, other applications may maintain their default or current translation techniques, resulting in a hybrid of translation techniques as described herein. For example, a small process that accesses physical memory in a relatively small, contiguous block, may rely on conventional methods for reloading the TLB on a miss, while a larger process may benefit from the replacement of the trap-handler/table-look-up mechanism with a function to compute a new TLB entry. In other embodiments, a translation technique different from the default technique may be applied when translating virtual addresses in a particular portion of an application's virtual address space.

In one example, a conventional translation approach may be employed for, a accesses of a code segment, which are typically read-only accesses to a small, relatively contiguous address range, while accesses of data structures, which may be more random and spread throughout the virtual memory space, may employ a function-based translation technique. In another example, an application may be allocated a contiguous space for code and data, but the operating system may determine that translation overhead may be reduced by resizing pages (i.e., by tweaking the existing translation technique). In some embodiments, if the operating system changes the page size, it may also reorganize the allocated memory so that the new virtual pages map to corresponding pages in physical memory with the same page size.

Similar or different translation techniques may be applied to two or more applications executing concurrently on the processor, in some embodiments. In other embodiments, different techniques may be applied to different regions of virtual or physical memory, regardless of the application to which they are allocated. In still other embodiments, virtual-to-physical translations for all applications may employ the same translation technique and all translations may employ a different technique if and when the operating system detects a need to dynamically change it. In various embodiments, any of the techniques described herein may be applied dynamically to an application or region of memory transparently to the application.

As described earlier, the combination of virtual-to-physical address translation techniques applied to virtual memory accesses of a given application, or region of memory, may be determined statically, such as by analyzing a predicted workload at compilation, in some embodiments. For example, an operating system or compiler program may be configured to predict the distribution of virtual memory access (e.g., the number and pattern of accesses to each virtual location) based on the source code of the application, and to determine a suitable translation technique for this distribution. In such embodiments, the determined techniques may be applied to all applications and regions of memory, or different techniques may be applied to different applications and/or regions of memory according to the analysis.

Also as described above, a programmer may be able to control or influence which virtual-to-physical mappings and translation techniques are used, in some embodiments. For example, a programmer may direct the operating system to use largest page size available for a given application, may direct it to assign the application to execute on a specific processor, or may direct it to allocate contiguous or localized memory to the application. If the operating system is not able, for example, to allocate a nearby, contiguous memory block right away, it may be configured to monitor and analyze the execution of this and other applications as they execute and may be able to reorganize the memory later to accommodate such a programmer directive. In some application embodiments, a programmer may supply a suggested translation function that may be employed as an alternative to table-based translation, as described above.

In some embodiments, specifics of an initial translation technique (including page size, TLB size, page-versus segment-based translations, or use of a translation function) for a given application or region of memory may correspond to a system-wide default set of techniques or may be based on a system-wide policy applied at compilation. For example, if an application will be accessing shared memory designated for copy-on-write, a policy may direct the operating system to organize the shared memory allocated to that application using a smaller page size than the page size used for memory allocated to other applications. In another example, if an application will be accessing only a small number of locations within a large page or segment, a policy may direct the operating system to compute and employ one or more address translation functions for that application. Similarly, a system-wide policy may dictate when and how often the operating system should analyze address translation performance and/or when and how often to change translation techniques for a given application or region of memory. In some embodiments, translation techniques may be applied, initially or dynamically, to individual threads or routines of an application, rather than applying the same or similar techniques to all threads or routines of the application.

As described above, the use of a function-based translation, versus a trap-handler with a table look-up, may be employed on a particular thread of an application. In some embodiments, different functions may be used to compute a TLB entry for different applications or threads, such as if different applications or threads use different page tables and/or access pages of different sizes. For example, one thread of an application may access a particular large memory block when executing complex computations (such as multiplying matrices), while another thread may access only a few memory locations (such as a bank of input/output buffers).

The appropriate use of various virtual-to-physical address translation techniques, whether singly or combined to form a hybrid technique, and the dynamic application thereof, may in some embodiments result in better performance and a broader scalability range for applications executing in a computer system employing virtual memory than the use of a single, fixed addresses translation technique.

Memory Protection Techniques

As described above, a common memory protection strategy in a computer system implementing virtual memory addressing may be to tie access rights of a processor, or a process executing on the processor, to a particular memory address range, or segment. For example, some portions, or segments, of memory may be designated as read-only, read-write, executable, or not executable. These access designations may, in some embodiments, be used to protect operating system code, application code, or data from viruses, run-away code, etc., by not allowing execution from a data segment, or write access to a code segment, for example. In another example, a shared library may allow read-only access by multiple applications, but may not allow direct write-access. In some embodiments, read-write access may be provided to a shared library through the use of a copy-on-write mechanism, in which the read-only shared library (or a portion thereof) is copied and the new copy is made writable. Keeping the original library intact may provide a way to recover from an unauthorized or unintended write to the copied library.

Using segmentation techniques to protect memory, as described above, may be inadequate in some computer systems. For example, if various portions of a segment require different permissions or if a portion of a physical memory to which a segment maps is allocated to a different process, then memory protection may need to be implemented separately from the segment-based translation technique. In another example, if operating system software, in managing virtual-to-physical memory mappings and allocation of memory to processes, moves data items or code from one physical memory location to another during run-time, delays or errors may occur when propagating the new addresses of the relocated items. A giant application may, in one example, unintentionally overwrite the operating system if care is not taken to protect memory segments if their mappings, and thus their access rights, change during execution. Worse yet, there may be circumstances in which computer processors, and/or their respective processes, are not trusted to restrict themselves according to their designated access rights. In one example, a virus may be configured to intentionally overwrite data, applications, or portions of an operating system.

Rather than constructing a complicated function for a processor to control all the various access rights for particular memory segments, memory protection may in some embodiments be implemented in memory controllers that have enough processing capability to assist with security-related tasks (more than that of a simple DRAM module, for example). In one embodiment, a memory controller may only accept writes from a processor when the write request includes a particular token corresponding to an identifier previously assigned by the operating system. The assigned identifier may represent the allocation of a particular block of memory to a given application, process, or processor, as described below. In some computer systems employing virtual memory, each process may be assigned one or more additional labels or tags specifying a "virtual context." That is, in some embodiments this "virtual context" may be used to specify one of a number of overlapping virtual address spaces (used for different purposes) that may be mapped to different physical address spaces. In such embodiments, address translation may map a virtual context/virtual address pair to a corresponding physical address and a TLB, such as the one illustrated in FIG. 4, may map a virtual context/virtual address pair to a corresponding physical address, rather than mapping a context-neutral virtual address to a physical address.

The identifier described above may correspond to a specific processor, or process thereof, or may be assigned to a particular thread of an application, in different embodiments. In some embodiments, to support token-based memory protection, a processor may be configured to supply such an identifier to one or more memory controllers. This identifier may be assigned by the operating system when a portion of memory is allocated to a particular processor, process, or thread, in some embodiments, and may be written to the corresponding memory controller, in some embodiments. For example, the identifier may be programmed in a register of the memory controller, or in another memory location, according to various embodiments. In other embodiments, the identifier may be assigned using a hardware implementation, such as a state machine. In some embodiments, the memory controller may be configured to store the identifier and to validate that access requests to the memory controller include a token corresponding to the stored identifier before allowing/performing accesses. Physical memory may be allocated directly to a processor, process or thread in some embodiments, while in other embodiments a block of virtual memory may be allocated to the processor, process, or thread and then later mapped to a portion of physical memory. Therefore, in various embodiments, assignment of an identifier to an allocation of memory may be done when a block of virtual memory is allocated to a processor, process or thread, or when a previously allocated virtual memory block is mapped to a physical block of memory.

This token-based memory protection technique may be described, in various embodiments, as one in which the processor performs an incomplete address translation and the memory controller does the rest, while also checking and controlling access rights. Therefore, in different embodiments, one or more memory controllers may include one or more registers or other structures for storing identifiers, a mechanism for receiving and storing them, and a mechanism for verifying that access requests include a matching token before they are allowed.

Figures 9, 10:
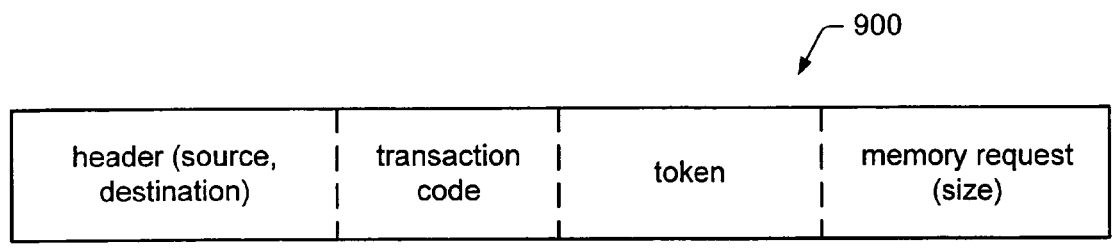
FIG. 9 illustrates an exemplary memory request packet, according to one embodiment.
FIG. 10 illustrates an associative array mapping process identifiers to address ranges, according to one embodiment.

Packet-style transactions, or a similar mechanism, may be implemented for data loads and stores between memory units and processors, in various embodiments. Such transactions routinely include information beyond the destination addresses and data, such as in a packet header. In some embodiments, this additional information may include one or more tokens to be used by the memory controller to validate accesses to the memory unit. One example of such a packet header is illustrated in FIG. 9. In this example, the header may include a source address, a destination address, a transaction code (e.g., read, write, unicast, broadcast), a token, and a memory request size. In this example, when a memory controller receives the request packet, it may compare the token to a process identifier stored in the memory controller and corresponding to the physical address(es) for which the request is made. If the token matches the stored process identifier, the memory controller may allow access to the portion of memory specified in the request packet.

In other embodiments, all memory controlled by a single memory controller may be allocated to the same process or thread, and the controller may use a single identifier to control access to it. In some embodiments, this identifier's value may represent an identifier of a memory device or its memory controller. In other embodiments, there may be different amounts of granularity in the amount of memory that is accessible using a single identifier in the memory controller. For example, different segments controlled by a single memory controller may be allocated to different processes or threads and thus the memory controller may associate different identifiers with the different segments. In some embodiments, the identifier's value may be equal to the page number of the page table corresponding to memory allocated to the processor/process, or may be equal to the segment number of the allocated memory. In other embodiments the identifier's value may be a value dependent on the page number or segment number, such as a hash of the page or segment number. In other embodiments, the identifier's value may represent a processor identifier, process identifier, or thread identifier. In still other embodiments, a "virtual context" label or tag, such as described above, may be included in the memory access packet instead of or in addition to the identifier.

The identifier or identifiers associated with various portions of a memory may be stored in the memory controller in one or more registers or in an associative array, in some embodiments. One such array is illustrated in FIG. 10. In this example, the array stores several process identifiers, as shown on the left, along with corresponding allocated address ranges, as shown on the right. While the example illustrated in FIG. 10 includes a one-to-one mapping of identifiers and allocated address ranges, in some embodiments more than one address range may be allocated to a single identifier. In other embodiments, such an array may be located in system memory (e.g., RAM 140) or in non-local memory, such as in disk storage 150, rather than in the memory controller.

The identifier assigned to each processor, process, or thread, may include one or more fields representing specific access rights for each controlled memory segment. For example, each field may specify access rights of an owner (or owner process), group (or group of processes), or administrator (or administrative process, such as system software). In this example, individual bits in each field, or combinations of bits, may be used to specify read, write, or execution access for each user (or process type). In another embodiment, access rights of users may not be specified, or different fields of the identifier may represent read, write, and execution rights, and bits may control access by certain users. In still other embodiments, separate registers may be used to store information about access rights associated with different identifiers and/or memory segments, or identifiers and access information may be partitioned in different combinations between storage locations in the memory controller and storage locations in other parts of the computer system. Alternatively, access rights for an owner, group or administrator may be encoded such that a single field may be used to specify the combination of access rights for two or more user types, rather than these rights being specified in separate fields of the identifier, in some embodiments.

Figure 11:
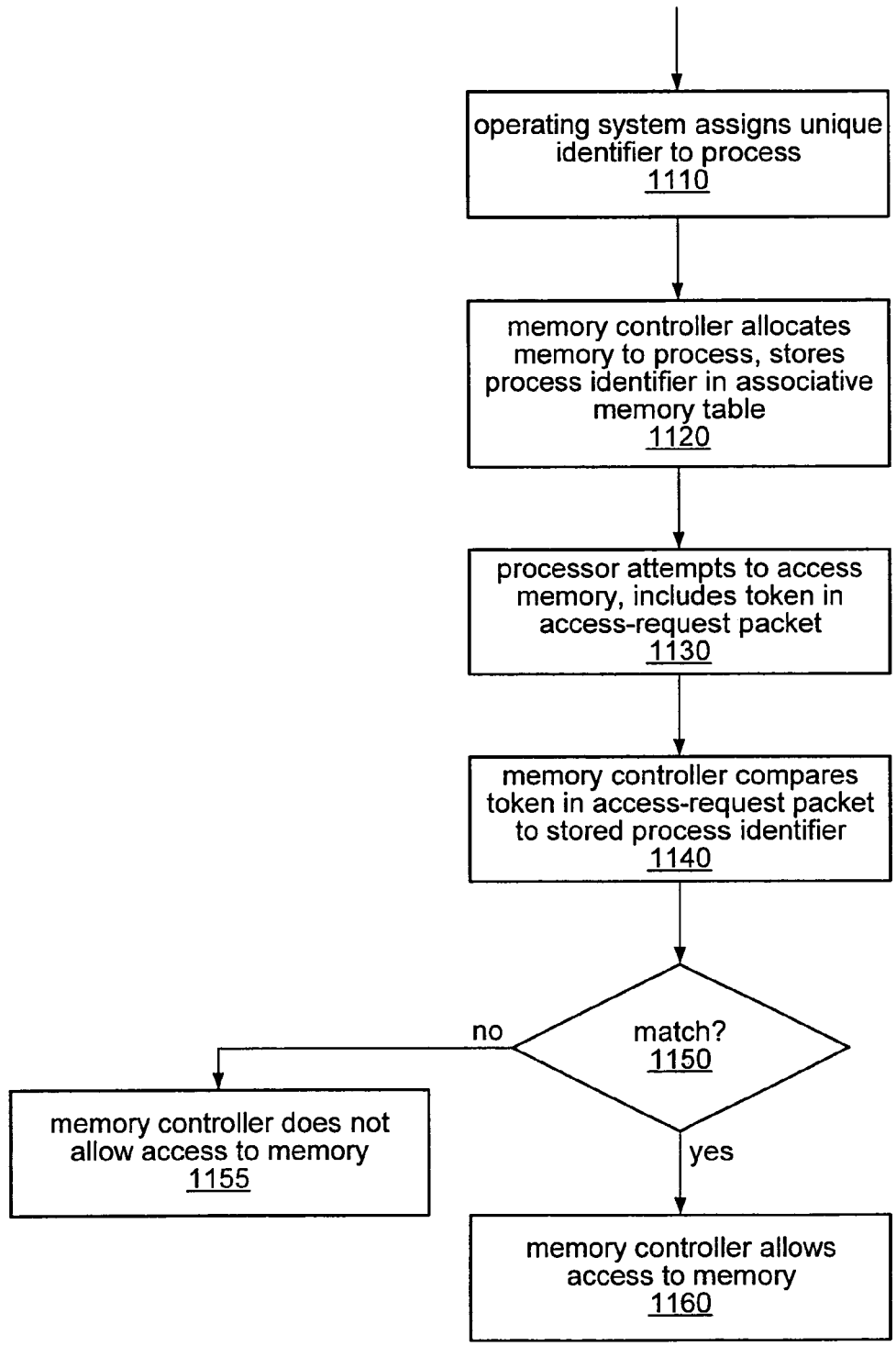
FIG. 11 is a flow chart illustrating an exemplary method for memory protection in a system employing virtual memory addressing.

An exemplary method for providing memory protection, as described herein, is illustrated by the flow chart in FIG. 11. In this example, a particular processor (or a respective process thereof) may be assigned a unique identifier by the operating system, as in 1110. This identifier may be write-accessible only by system software, and not alterable by user code, in some embodiments. In other embodiments, if memory protection is done on per-thread basis rather than on a process or processor basis, specialized hardware may be used to bond identifiers to their respective threads.

In this example, when memory is allocated for the use of the particular processor (or process), the memory controller controlling that memory may associate the unique identifier of the processor (or process) with the memory allocated to it, as in 1120. For example, the processor may write the identifier to the memory controller and the memory controller may store the identifier in one or more registers or in an associative-memory table, such as that illustrated in FIG. 10. The registers or associative array may serve to associate one or more specific blocks of memory with each identifier. In some embodiments, the identifiers may include other information, such as information specifying owner, group, or administrator access rights described above.

In this example, when a processor (or a respective process) attempts to access memory, hardware or system software may include a token, corresponding to the processor's (or process') unique identifier, in an access-request packet before transmitting that request to the memory controller, as in 1130.

On receipt of the request at the memory unit, the memory controller may compare the token in the request with the identifier it has stored and associated with the address or address range included in the request, as in 1140 and 1150.

If the token in the access request matches the stored identifier, as in 1160, the memory controller may fulfill the request. If the token in the request does not match the stored identifier, the memory controller may not fulfill the request, as in 1155. The memory controller may also be configured to generate and/or return an indication of an error, e.g., to generate an error report or return a value indicating an error, or to take other appropriate action, if the token in the request does not match the stored identifier, in some embodiments.

The hardware or system software, such as the operating system, that allocates memory to a particular processes and assigns an identifier may, in some embodiments, be assumed to be trusted. In some embodiments, accesses by the processor on behalf of a trusted process may include a particular system-wide or processor-specific token value, such as zero. In such embodiments, when the memory controller receives an access request, the memory controller may be configured to compare the token in the request to both the stored identifier corresponding to the memory region of interest, and to a system-wide token value. If the token in the request packet matches the system-wide token value, this may indicate that the processor has verified the process' access rights, so the memory controller may not have to enforce protection for that block. For example, if the operating system is accessing the memory, the processor may validate that this is an allowed access and may include the system-wide token in the corresponding request packet. When the memory controller receives the request packet and detects the system-wide token, it may allow unrestricted access by the requesting process, even if the memory block has been designation as having limited access rights.

In a computer system implementing virtual memory, data or instruction items may be moved from one memory unit or subsystem to another, or from one block of memory within a memory unit or subsystem to another block of memory within the same memory unit or subsystem, as the operating system manages the organization, allocation, mapping, and reorganization of virtual and physical memory. In some embodiments, an associated processor (or process) identifier that has been stored by the memory controller may be moved, along with these data or instruction items, so that the token comparison mechanism will use the correct identifier value after the data items are moved to their new location. For example, if a second block of memory in the same subsystem is allocated to a particular application, the identifier may be conveyed to the memory controller along with the physical address of the newly allocated block. In this case, the memory controller may be configured to disassociate the identifier from the first allocated block of memory and associate it with the second allocated block of memory. Similarly, if a block of memory in a second subsystem is allocated to a particular application, an indication that a block of memory previously allocated in the first subsystem is no longer needed may be sent to the memory controller of the first memory subsystem. In this example, the identifier may then be sent to the memory controller of the second memory subsystem indicating the new allocation of a block of its memory to the application. In this way, a protection mechanism that prevents processors (or processes) from accessing memory not reserved for their use may not depend on specific values of the virtual or physical address of the memory in question. This protection mechanism may be insulated from errors or falsification of memory addresses by processors (or processes) in some embodiments. Also, since the mechanism uses security measures implemented by memory controllers, which may be remote from processors where user code is executing, the mechanism may be less susceptible to accidental or deliberate errors in security mechanisms operating in connection with those processors (or processes), in some embodiments.

The memory protection technique described herein may also be used with shared memories in some embodiments. In such embodiments, a single identifier may represent two or more processors, processes, or threads sharing a memory resource and this identifier may be stored by the appropriate memory controller as described above. All the processors, processes, or threads authorized to access the shared memory would be configured to include a token matching the single identifier in memory access request packets directed to the shared memory, in this example. If the shared memory is designated for copy-on-write, as described above, then an attempt to modify the shared memory may in some embodiments trigger the operating system or other memory management mechanism to copy the portion of shared memory that is to be modified and to assign a different identifier to the processor, process, or thread that modifies the copy. In other embodiments, the processors, processes or threads authorized to share access to a memory resource may each have their own assigned identifier and the corresponding memory controller may be configured to associate more than one identifier with a single block of memory. In such embodiments, the processors, processes or threads sharing the memory may all have the same access rights to the memory, such as read-only access or authority to execute instructions from that portion of memory. In other embodiments, two or more of the processors, processes, or threads may have different access rights. For example, one process may only be able to read the shared memory, while another process may be able to modify the shared memory.

A memory protection mechanism, as described herein, may be combined with the memory virtualization/translation techniques described to provide a hybrid approach to address translation and/or memory protection, in some embodiments. For example, if a particular application does not require address translation, the operating system may be configured to free up memory on one or more memory controllers to make a large block of contiguous memory available, to turn off the TLB and translation table searches and to let the process run on the large contiguous block without the overhead of address translation. In this example, the application may lose the basic protection afforded by the address translation technique, but the operating system may implement token-based memory protection for these accesses, as described above, instead. In another example, an application that accesses very large arrays in one region of memory, without address translation, may use token-based memory protection implemented in the memory controller for accesses to that region, and may employ address translation by the processor and operating system, according to one of the techniques described herein, for accesses to all other memory regions. In some embodiments, two or more techniques may be employed at once for the same application and/or memory block, with one or more technique providing memory protection for all or a portion of the memory accesses, while one or more other techniques provide memory contiguity and reduced address translation overhead. For example, an application may implement function-based address translation for some accesses and memory controller based (token-based) protection for others, or may use both function-based translation and token-based protection for all or a portion of all accesses. In general, any combination of the translation and protection mechanisms described herein, whether determined and implemented statically or dynamically according to an application's workload, may be employed in various embodiments.

The use of token-based memory protection, as described herein, along with various memory virtualization/translation techniques may in some embodiments provide protection in circumstances when the common stratagem of having the processor (or process) use memory address range as a placeholder for access rights to memory is not reliable. This may include cases in which processors (and/or processes) may not be trusted to implement memory protection.

Exemplary Computer System Embodiment

Although many of the embodiments described herein involve software implementations of address translation and memory protection techniques, these methods may instead be implemented in hardware or in any combination of hardware and software, in other embodiments. For example, a state machine or other circuitry may be used to assign an identifier to a process, to implement a function to compute a physical memory address from a virtual memory address, or to compare a token in a memory request packet to an identifier stored in a memory or memory controller. In another example, a computer system may include a hardware implementation of a page table walk, or a hardware bypass of a generic trap handler, allowing a jump directly to a translation function call on a TLB miss.

Figure 12:
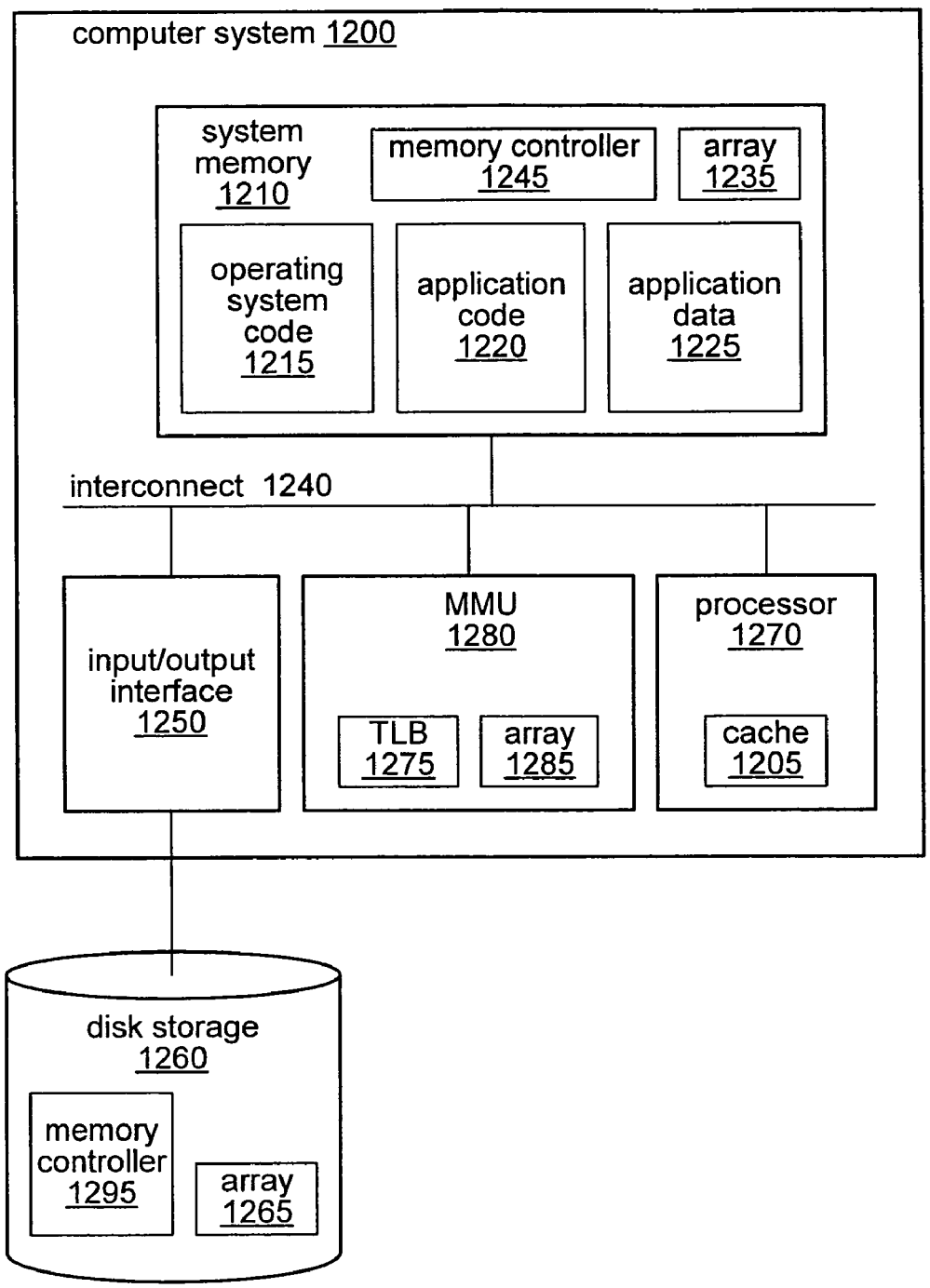
FIG. 12 illustrates a computing system suitable for implementing various memory virtualization and protection techniques, according to different embodiments.

A computer system suitable for implementing the memory virtualization/translation and protection techniques described herein is illustrated in FIG. 12. This exemplary computer system 1200 may include a processor 1270, a memory management unit (MMU) 1280, input/output interface 1250, interconnect 1240, and system memory 1210. Computer system 1200 may be coupled to disk storage 1260 through input/output interface 1250. In other embodiments, computer system 1200 may include two or more processors 1270, two or more memory management units (MMUs) 1280, multiple input/output interfaces 1250, two or more blocks of system memory 1210 and/or additional disk storage devices 1260. In some embodiments, computer system 1200 may implement all or part of the functionality described herein, while in other embodiments, various components of the memory virtualization/translation and protection techniques described herein may be implemented by a distributed system including a number of computing nodes (or simply, nodes), such as the computer system embodiment shown in FIG. 12 and discussed below. In various embodiments, the functionality of a given component may be implemented by a particular node or distributed across several nodes. In some embodiments, a given node may implement the functionality of more than component of memory virtualization/translation and protection.

In some embodiments, processor 1270 may include one or more cache memories 1205 and execution logic configured to implement other functionality of processor 1275, e.g., address calculation, instruction fetch and execution, arithmetic calculations, Boolean calculations and manipulations, digital signal processing, or any other functionality of a general-purpose or special-purpose processor, according to various embodiments. Processor 1270 may be configured to implement any of various instruction set architectures, such as x86, SPARC, PowerPC, etc. In some embodiments, processor 1270 may include execution logic configured to implement a single CPU core, multiple CPU cores, or any combination of one or more general-purpose CPU cores and special-purpose cores (e.g., digital signal processors, hardware accelerators, co-processors, etc.) In various embodiments, processor 1270 may include execution logic configured to implement a superscalar architecture or may be configured to implement multi-threading.

Computer system 1200 may also include a memory management unit (MMU) 1280, as shown in FIG. 12. In various embodiments, MMU 1280 may include a Translation Lookaside Buffer (TLB) 1275. As described herein, TLB 1275 may be configured to store recently used virtual-to-physical address translations, and may be implemented as a register array, specialized cache, or as any other hardware or software data structure in computer system 1200 suitable for this purpose. In some embodiments, MMU 1280 may be implemented as a standalone component of computer system 1200. In other embodiments, MMU 1280 may be implemented as a tightly coupled co-processor or as a functional unit of processor 1270. MMU 1280 may be implemented as a separate device, e.g., as an integrated circuit device in the same package as processor 1270 or in a separate package, or all or part of its functionality may be integrated into processor 1270, in various embodiments. MMU 1280 may be configured to implement various aspects of the memory virtualization/translation and protection techniques described herein, in some embodiments. For example, in some embodiments MMU 1280 may be configured to access the appropriate translation tables and load translations into TLB 1275 if TLB 1275 does not contain a mapping for a given virtual address. In some embodiments, MMU 1280 may be configured to perform page-based or segment-based translations, such as by using the high order bits of a virtual address to determine the page of physical memory corresponding to the virtual address. In other embodiments, the techniques described herein as being performed by MMU 1280 may instead be performed by operating system code 1215, or may be partitioned differently between operating system code 1215 and MMU 1280, or between other components of computer system 1200. For example, in some embodiments some or all of the functionality of MMU 1280 may be integrated with a load/store functional unit of processor 1270.

As shown in FIG. 12, system memory 1210 may include operating system code 1215, application code 1220, application data 1225, and associative array 1235. Operating system code 1215 may include program instructions configured to implement all or part of any of the various memory virtualization/translation techniques and memory protection techniques described herein. For example, operating system code 1215 may include program instructions configured to implement memory management routines for allocating various blocks of system memory 1210 or disk storage 1260 to an application executing on processor 1270 and/or for assigning an identifier to that application. In some embodiments, operating system code 1215 may include program instructions configured to implement page-based, segment-based, or function-based virtual-to-physical address translation. In some embodiments, the operations and functions comprising operating system code 1215 and various memory management routines may be partitioned in various ways between themselves and between local memory, such as a cache 1205 in processor 1270 or system memory 1210, and non-local memory, such as disk storage 1260. Operating system code 1215 may be implemented in any of various programming languages or methods, according to various embodiments. In some embodiments, all or portions of operating system code 1220 may be stored in memory co-located with processor 1270, such as temporarily in one or more cache memories 1205, or in specialized hardware, in addition to, or instead of, in system memory 1210.

Application code 1220 may include program instructions configured to implement one or more software applications suitable for execution on processor 1270. Application code 1220 may be implemented in any of various programming languages or methods, according to various embodiments. Software applications included in application code 1220 may access cache 1205, system memory 1210, disk storage 1260, or other memories directly or according to any of the memory virtualization/translation techniques described herein, in different embodiments. These memory accesses may be implemented using packet transactions, in some embodiments, and a memory request packet may include a token corresponding to a processor or process identifier used by memory controller 1245 to validate the processor's (or process') access rights. Application data 1225 may include storage for data accessible by one or more software applications implemented in application code 1220 and may also be accessible by operating system code 1215, or other program instructions, in various embodiments. In some embodiments, all or portions of application code 1220 may be stored in memory co-located with processor 1270, such as temporarily in one or more cache memories 1205, or in specialized hardware, in addition to, or instead of, in system memory 1210.

Associative array 1235 may include a table of processor or process identifiers and associated memory addresses or address ranges. These identifiers and associated memory addresses may be used in implementing token-based memory protection, as described herein. In other embodiments, an array associating identifiers with memory addresses and/or address ranges may be located in MMU 1280 (shown as element 1285), disk storage 1265 (shown as element 1265), or elsewhere on computer system 1200, or the information described herein as being included in such an associative array may be partitioned differently and included in one or more registers, tables, or arrays distributed among two or more components of computer system 1200 or disk storage 1260.

System memory 1210 may be implemented as any type of computer-accessible storage media, including, DRAM, SRAM, EDO RAM, SDRAM, DDR SDRAM, Rambus RAM, flash memory, etc. System memory 1210 may be organized in any of various configurations, some of which are described herein, including, but not limited to, pages, segments, or any other blocks of contiguous or non-contiguous memory, and may be mapped to virtual addresses in operating system code 1215 and/or application code 1220 according to any of various techniques, including those described herein.

Disk storage 1260 may be implemented as any type of computer-accessible storage media, including, but not limited to installation media, e.g., a CD-ROM or floppy disk, or non-volatile memory such as a magnetic media, e.g., a hard drive or optical storage and may be separate from computer system 1200, as shown in FIG. 12, or may be a component of computer system 1200, in other embodiments. Disk storage 1260 may be configured to store program instructions and/or data for operating system code 1215, application code 1220, or any other software suitable for execution on computer system 1200. In some embodiments, disk storage 1260 may be configured to store program instructions and/or data for software executable on another computer system, such as if disk storage 1260 is a shared resource. As shown in FIG. 12, disk storage 1260 may include a memory controller 1295, which may be configured to implement the functions of a memory controller described herein. For example, memory controller 1295 may include hardware or software configured to implement token-based protection of the memory in disk storage 1260. In some embodiments, disk storage 1260 may include an associative array 1265, which may be configured to store identifiers and associated memory addresses for use in token-based memory protection, as described herein. In other embodiments, token-based memory protection may be implemented by other hardware and/or software included in disk storage 1260 or elsewhere in computer system 1200.

In some embodiments, input/output interface 1250 may be configured to implement one or more of various interface or network standards, e.g., Peripheral Component Interconnect (PCI), Ethernet, HyperTransport (HT), Infiniband, or any variant or successor of these or other suitable input/output protocols. In some embodiments, some or all of the functionality of input/output interface 1250 may be included in processor 1270, rather than as a separate component.

The functionality referred to herein regarding various techniques for memory virtualization, virtual-to-physical address translation, and memory protection may correspond to the functionality of hardware or software modules or portions of hardware or software modules, according to various embodiments. The operations referred to herein may be modules or portions of modules (e.g., software, firmware, or hardware modules), according to various embodiments. For example, software modules implementing memory virtualization/translation and protection may include a computer program or subroutines thereof encoded on one or more computer accessible media.

Additionally, those skilled in the art will recognize that the boundaries between modules and/or components are merely illustrative and alternative embodiments may merge modules/components or impose an alternative decomposition of functionality of modules and components. For example, the modules discussed herein may be decomposed into sub-modules to be executed as multiple computer processes or to be implemented as multiple hardware components (such as integrated circuits and/or printed circuit boards). Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention, according to various alternate embodiments.

Thus, the flows described herein, the operations thereof and modules therefore may be implemented in hardware on a computer system configured to execute the operations of the flows and/or may be implemented in software executed by the computer system from computer accessible media, according to various embodiments. In some embodiments, the flows may be embodied in a machine-readable and/or computer accessible medium, such as system memory 1210, disk storage 1260 or another suitable medium, for configuring a computer system to execute the flows, as described above. Thus, one or more software modules implementing all or part of a the various memory virtualization/translation and protection methods described herein may be stored within and/or transmitted to a computer system memory to configure the computer system to perform the functions of the module(s), according to various embodiments.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow.

Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer-implemented method, comprising, during execution of a first application:
   receiving, on behalf of said first application, a first memory request directed to a first virtual memory address;
   translating said first virtual memory address to a corresponding first physical address according to a first address translation technique;
   analyzing performance of said first application;
   dynamically selecting a second address translation technique for translating virtual memory addresses to corresponding physical memory addresses on behalf of said first application; and
   subsequent to said selecting a second address translation technique, receiving, on behalf of said first application, a second memory request directed to a second virtual memory address, and translating said second virtual memory address to a corresponding second physical address according to said second address translation technique;
   wherein said dynamically selecting a second address translation technique is dependent, at least in part, on a user policy and on results of said analyzing; and
   wherein said dynamically selecting and said translating according to said second address translation technique are performed transparently to said first application.

2. The method of claim 1, further comprising determining said first address translation technique dependent on a predicted distribution of virtual memory addresses to be accessed by said first application.

3. The method of claim 1, wherein said analyzing performance of said first application comprises:
   measuring one or more of: a number of translation lookaside buffer (TLB) misses, a number of trap handler calls, a memory access time, a number of table look-up operations, a distribution of memory accesses, and a size of a data structure; and
   comparing results of said measuring to one or more performance criteria.

4. The method of claim 1, wherein each of said first address translation technique and said second address translation technique comprises one or more of: page-based translation of virtual memory addresses to physical memory addresses, segment-based translation of virtual memory addresses to physical memory addresses, a table-lookup of a virtual-to-physical address mapping, and function-based translation of virtual memory addresses to physical memory addresses.

5. The method of claim 1, further comprising, during said execution, reorganizing a memory in conjunction with said selecting a second address translation technique, wherein said reorganizing said memory comprises one or more of: reducing fragmentation of a portion of said memory, reorganizing a page table corresponding to said memory, changing one or more mappings between a virtual address space and a corresponding physical address space of said memory, and allocating a different portion of said memory to said first application.

6. The method of claim 1, wherein said first address translation technique and said second address translation technique differ in one or more of: a page size, a segment size, and a virtual-to-physical address space mapping.

7. The method of claim 1, further comprising, during said execution:
   selecting a third address translation technique for translating virtual addresses to corresponding physical addresses on behalf of a second application;
   subsequent to said selecting a third address translation technique, translating a third virtual memory address to a third physical memory address on behalf of said second application according to said third address translation technique;
   wherein said third address translation technique is different from one or more of said first address translation technique and said second address translation technique; and
   wherein said selecting said third address technique and said translating according to said third address translation technique are performed transparently to said first application.

8. A computer system, comprising:
   a processor configured to support a plurality of memory virtualization techniques; and
   a memory configured to communicate with said processor;
   wherein said processor is further configured to:
      determine a first one of said plurality of address translation techniques dependent on a predicted distribution of virtual memory locations to be accessed by a first application;
      translate, on behalf of said first application executing on said processor, a memory request directed to a first virtual memory address to a first physical memory address of said memory according to said first one of said plurality of memory virtualization techniques;
      during said executing, dynamically select a second one of said plurality of memory virtualization techniques for translating virtual addresses, on behalf of said first application, to corresponding physical addresses of said memory;
      during said executing and subsequent to said selecting a second one of said plurality of memory virtualization techniques, translate, on behalf of said first application, a second memory request directed to a virtual memory address to a corresponding physical memory address of said memory according to said second one of said plurality of memory virtualization techniques;
      wherein said dynamically selecting and said translating according to said second one of said plurality of memory virtualization techniques are performed transparently to said first application.

9. The computer system of claim 8,
   wherein said processor is further configured to analyze performance of said first memory virtualization technique as applied to said first application executing on said processor during said executing;
   wherein to analyze performance of said first one of said plurality of memory virtualization techniques, said processor is configured to:
      monitor one or more of: a number of translation lookaside buffer (TLB) misses, a number of trap handler calls, a memory access time, a number of table look-up operations, a distribution of memory accesses, and a size of a data structure; and
      compare results of said monitoring to one or more performance criteria; and
   wherein said dynamically selecting a second one of said plurality of memory virtualization techniques is dependent on said analyzing.

10. The computer system of claim 8, wherein each of said first one of said plurality of memory virtualization techniques and said second one of said plurality of memory virtualization techniques comprises a different one of: page-based translation of virtual memory addresses to physical memory addresses, segment-based translation of virtual memory addresses to physical memory addresses, a table-lookup of a virtual-to-physical address mapping, and function-based translation of virtual memory addresses to physical memory addresses.

11. The computer system of claim 8, wherein said processor is further configured to reorganize said memory, during said executing, in conjunction with said selecting a second one of said plurality of address translation techniques, wherein to reorganize said memory, said processor is configured to perform one or more of: reducing fragmentation of a portion of said memory, reorganizing a page table corresponding to said memory, changing one or more mappings between a virtual address space and a corresponding physical address space of said memory, and allocating a different portion of said memory to said first application.

12. The computer system of claim 8, wherein said first one of said plurality of address translation techniques and said second one of said plurality of address translation techniques differ in one or more of: a page size, a segment size, and a virtual-to-physical address space mapping.

13. The computer system of claim 8, wherein said dynamically selecting a second one of said plurality of memory virtualization techniques is dependent, at least in part, on a policy specified by a user.

14. A processor, comprising:
an address translator configured to support a plurality of memory virtualization techniques; and
a virtualization technique selector;
wherein said address translator is configured to translate, on behalf of a first application executing on said processor, a memory request directed to a first virtual memory address to a first physical memory address according to a first memory virtualization technique;
wherein said virtualization technique selector is configured to dynamically select a second memory virtualization technique for translating virtual addresses to physical addresses on behalf of said first application during said executing;
wherein said first memory virtualization technique comprises translating virtual addresses to physical addresses using one or more look-up operations on a stored mapping of virtual addresses to physical addresses;
wherein said second memory virtualization technique comprises translating virtual addresses to physical addresses by generating physical addresses from respective virtual addresses using a mathematical or logical function applied to the respective virtual addresses without performing a look-up operation on a stored mapping of virtual addresses to physical addresses;
wherein, during said executing and subsequent to said virtualization technique selector selecting a second memory virtualization technique, said address translator is configured to translate a second memory request directed to a second virtual memory address to a second physical memory address on behalf of said first application according to said second memory virtualization technique; and
wherein said dynamically selecting and said translating according to said second memory virtualization technique are performed transparently to said first application.

15. The processor of claim 14, further comprising a performance analyzer configured to analyze performance of said first memory virtualization technique as applied to said first application executing on said processor during said executing, wherein said dynamically selecting a second memory virtualization technique is dependent on said analyzing.

16. The processor of claim 15, wherein to analyze performance of said first memory virtualization technique, said performance analyzer is configured to:
monitor one or more of: a number of translation lookaside buffer (TLB) misses, a number of trap handler calls, a memory access time, a number of table look-up operations, a distribution of memory accesses, and a size of data structures accessed; and
compare results of said monitoring to one or more performance criteria.

17. The processor of claim 14, further comprising a memory reorganizer; wherein in conjunction with said dynamically selecting a second memory virtualization technique said memory reorganizer is configured to perform one or more of: reducing fragmentation of a portion of said memory, reorganizing a page table corresponding to said memory, changing one or more mappings between a virtual address space and a corresponding physical address space of said memory, and allocating a different portion of said memory to said first application.

18. The processor of claim 14, wherein said first memory virtualization technique and said second memory virtualization technique further differ in a virtual-to-physical address space mapping.

19. The processor of claim 14, wherein said dynamically selecting a second memory virtualization technique is dependent, at least in part, on a policy specified by a user.

* * * * *